Sept. 1, 1925.  
W. McLAREN  
AUTOMATIC CUP PASTRY MAKING MACHINE  
Filed March 10, 1923     13 Sheets-Sheet 4
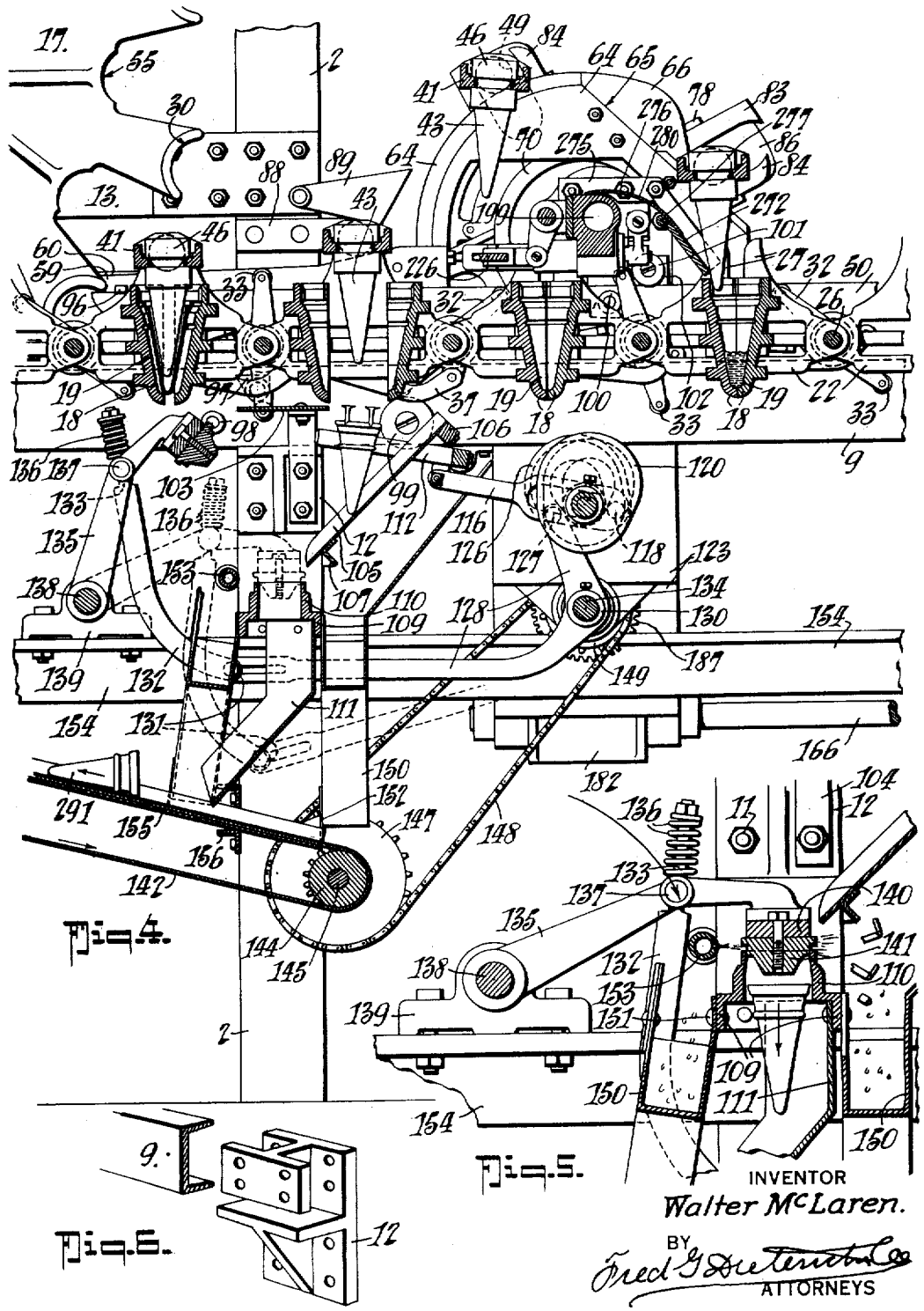
INVENTOR  
*Walter McLaren.*  
BY  
*Fred G. Dieterich*  
ATTORNEYS Sept. 1, 1925.
W. McLAREN
1,551,998
AUTOMATIC CUP PASTRY MAKING MACHINE
Filed March 10, 1923   13 Sheets-Sheet 5
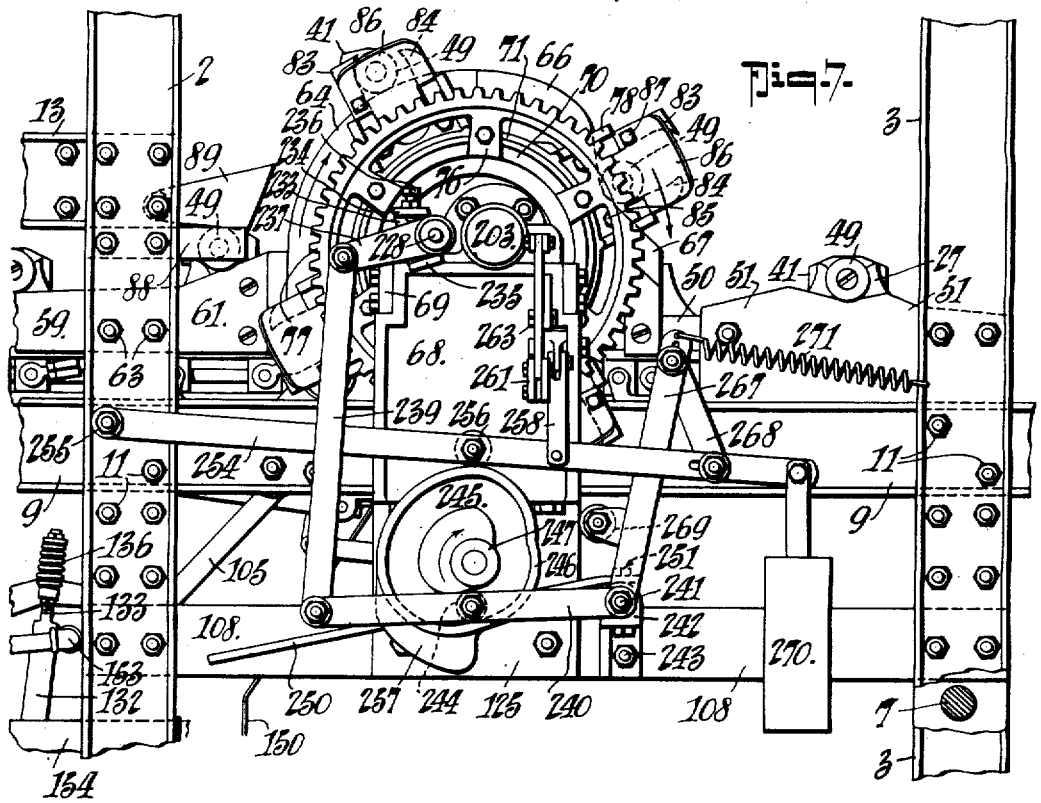
Fig.7.
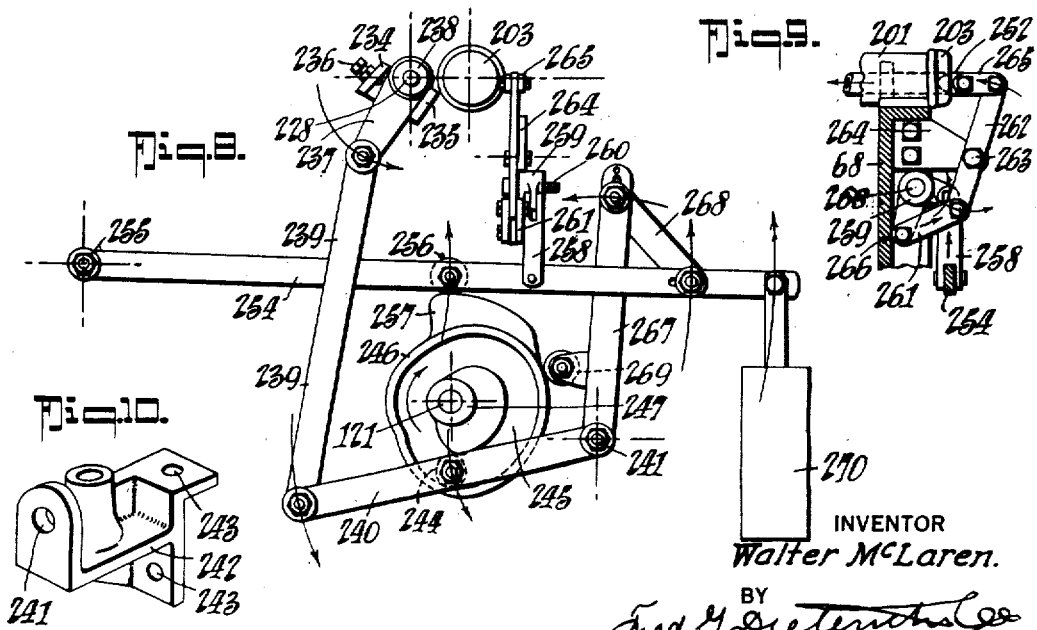
Fig.8.   Fig.9.
Fig.10.
INVENTOR
Walter McLaren.
BY
Fred G. Dieterich
ATTORNEYS

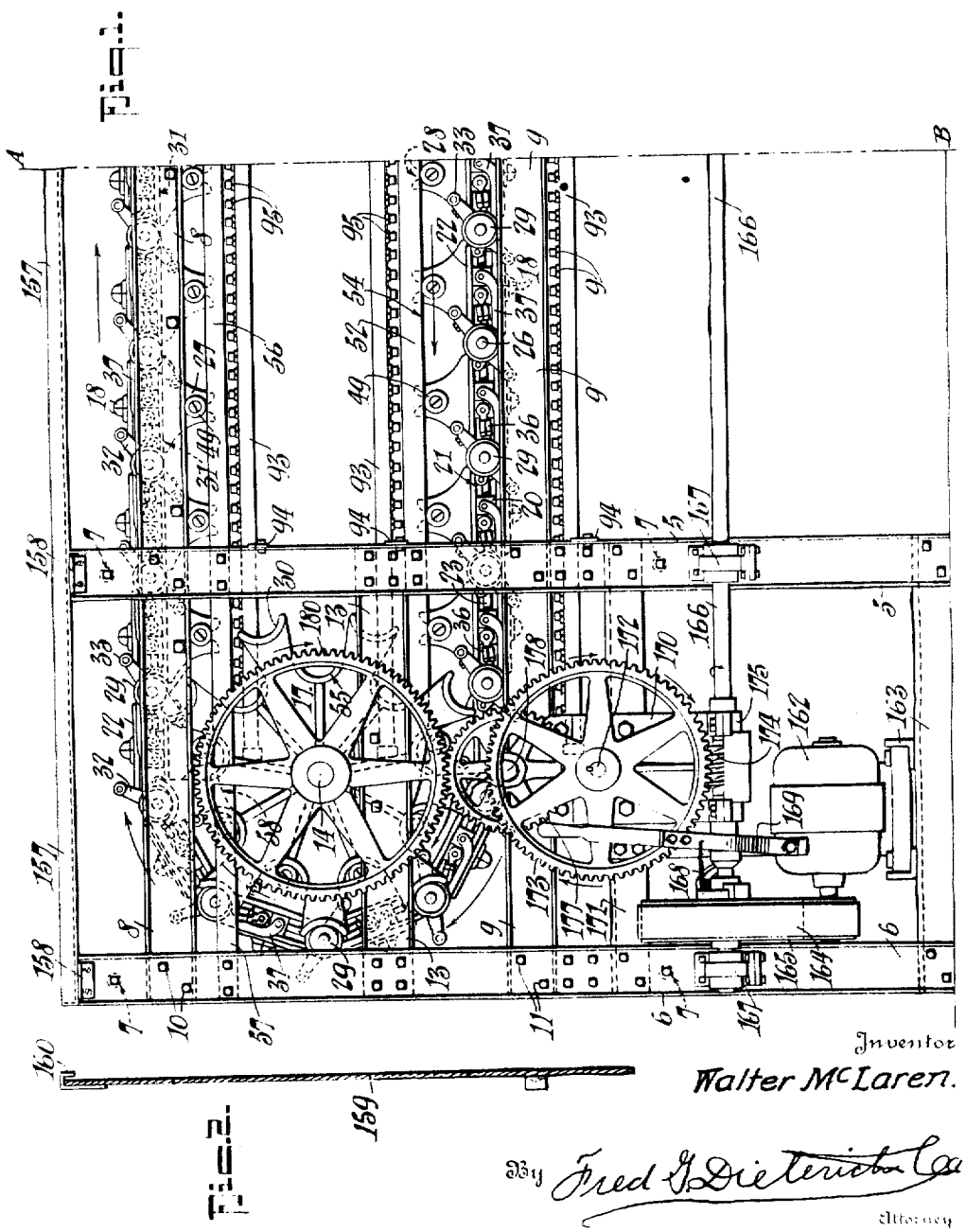

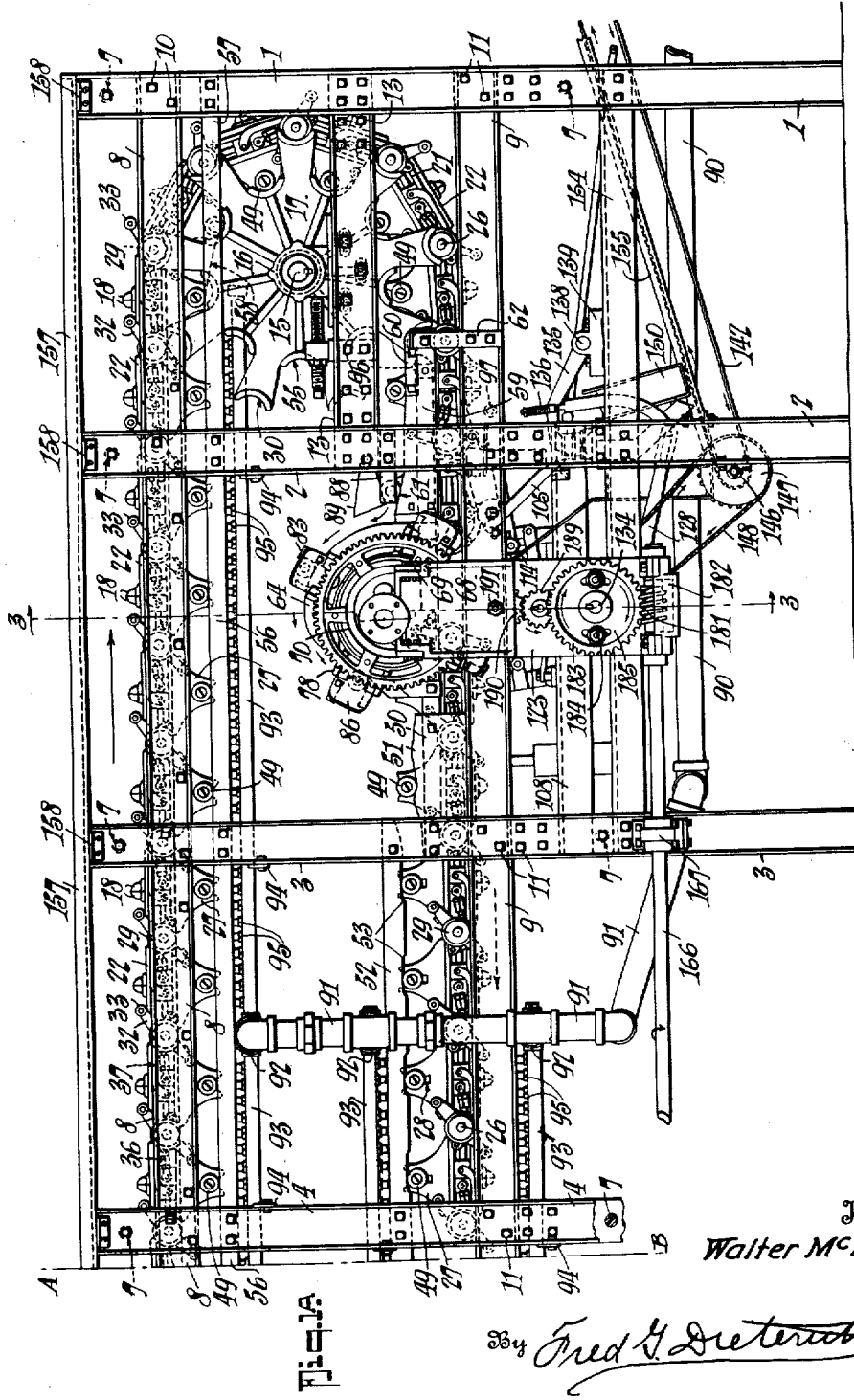

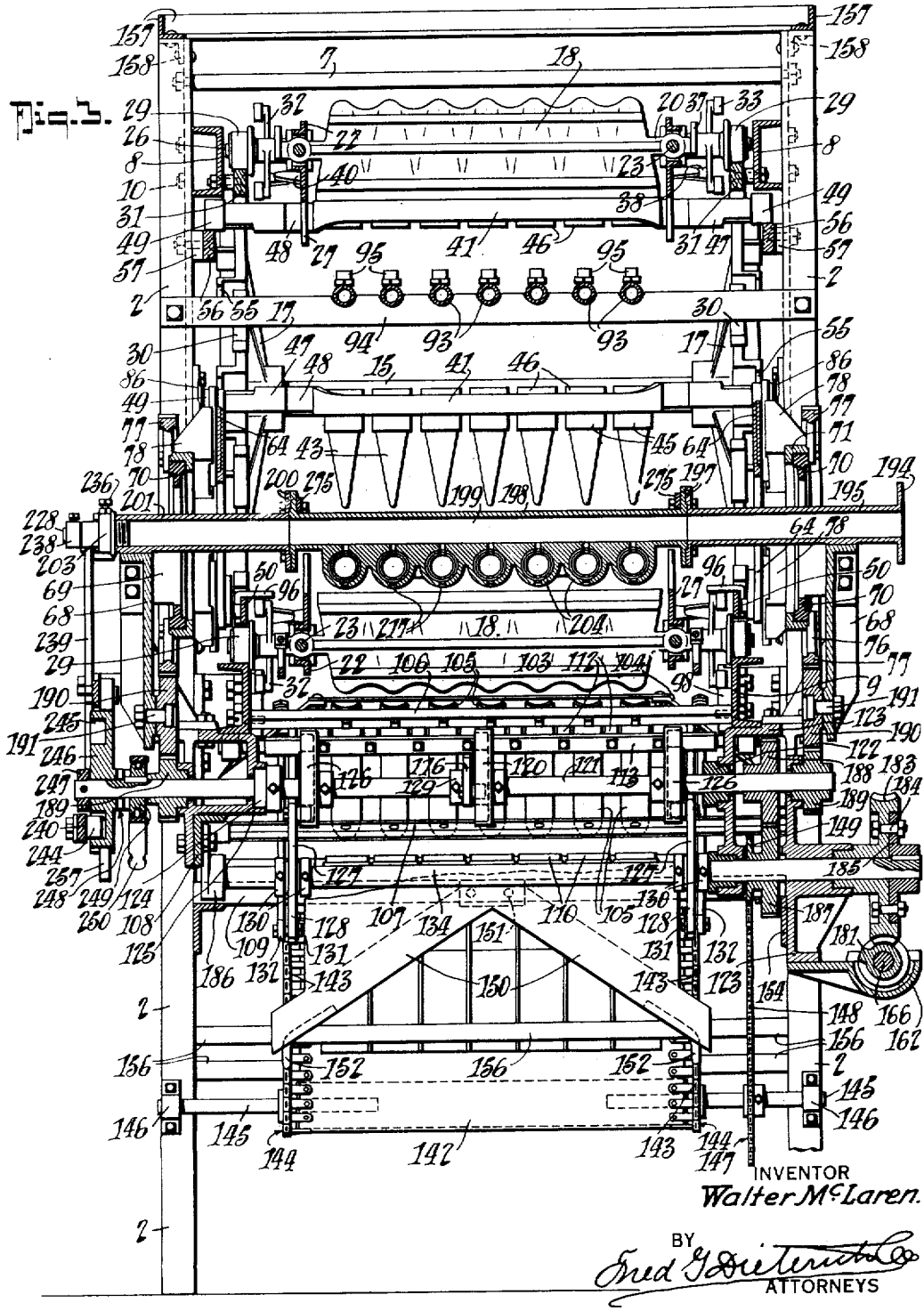

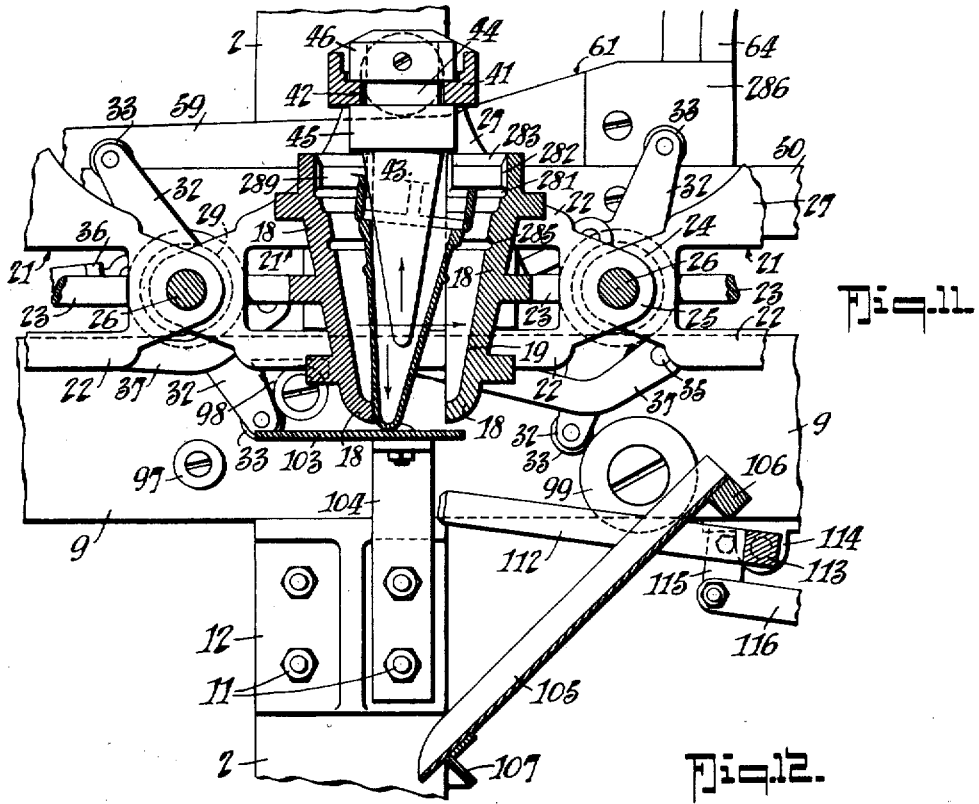
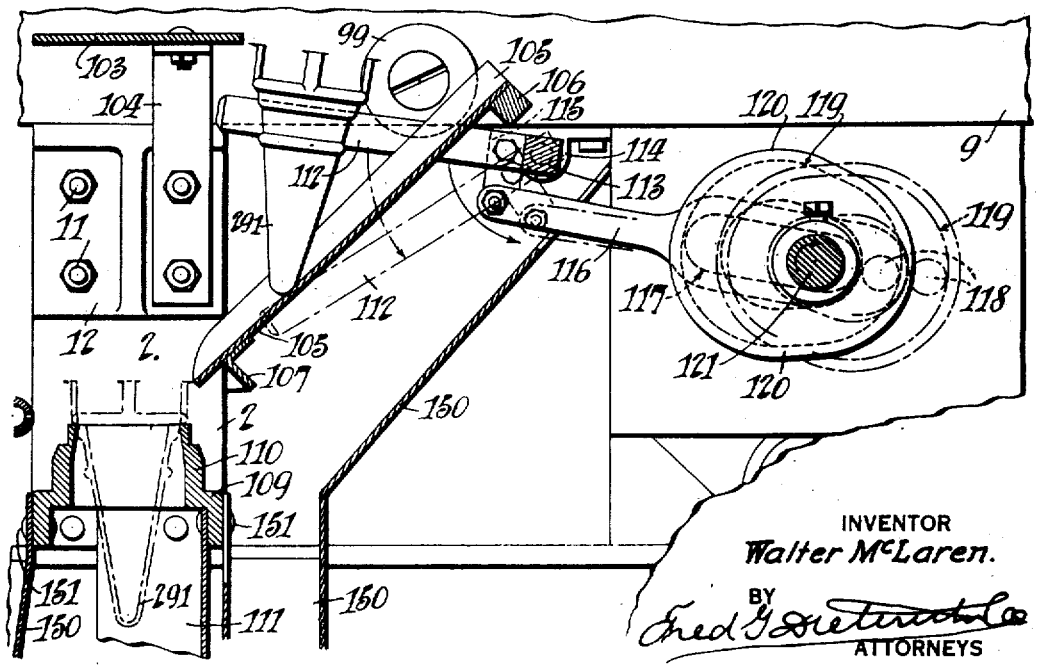

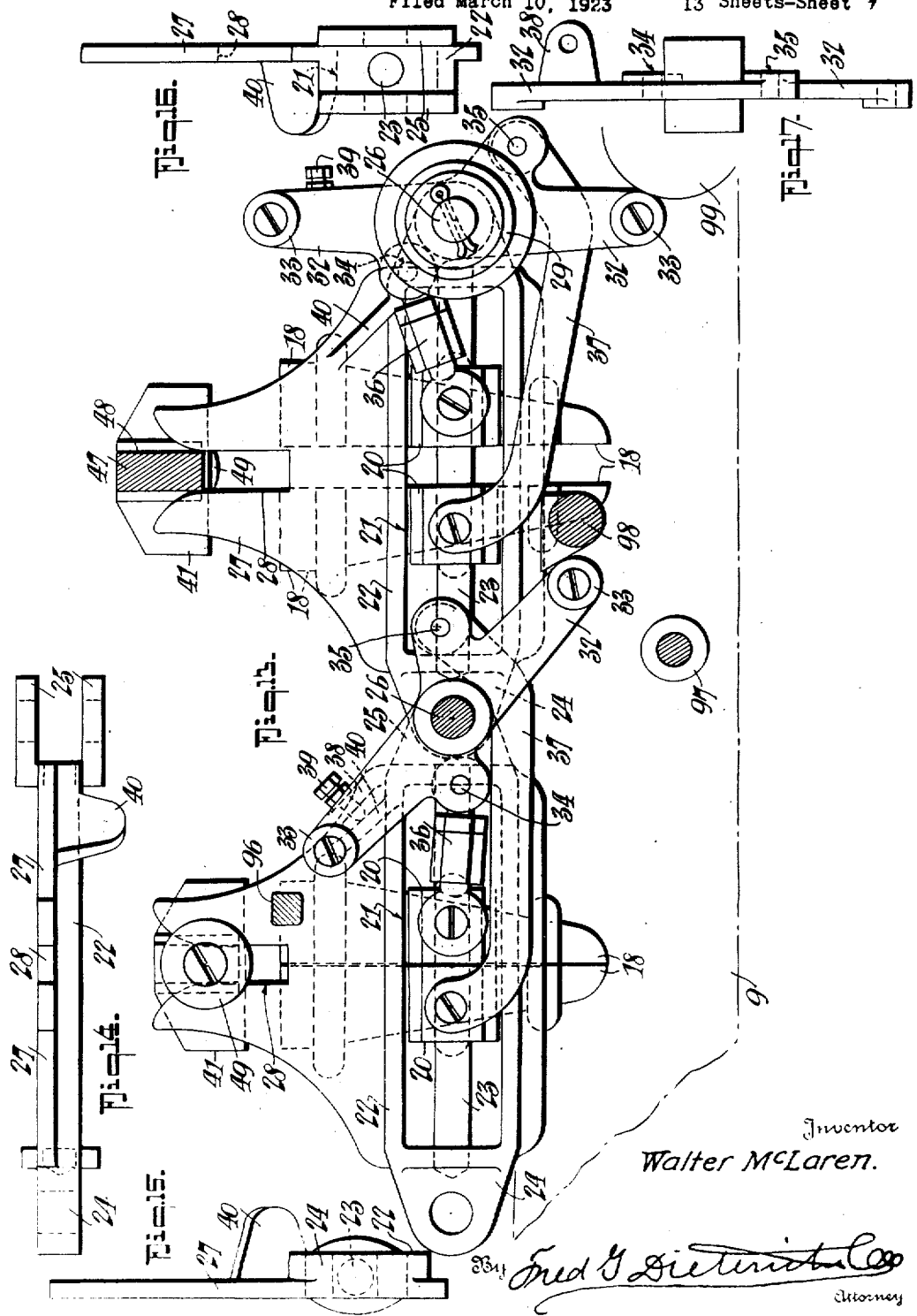

Sept. 1, 1925.   1,551,998
W. McLAREN
AUTOMATIC CUP PASTRY MAKING MACHINE
Filed March 10, 1923   13 Sheets-Sheet 8
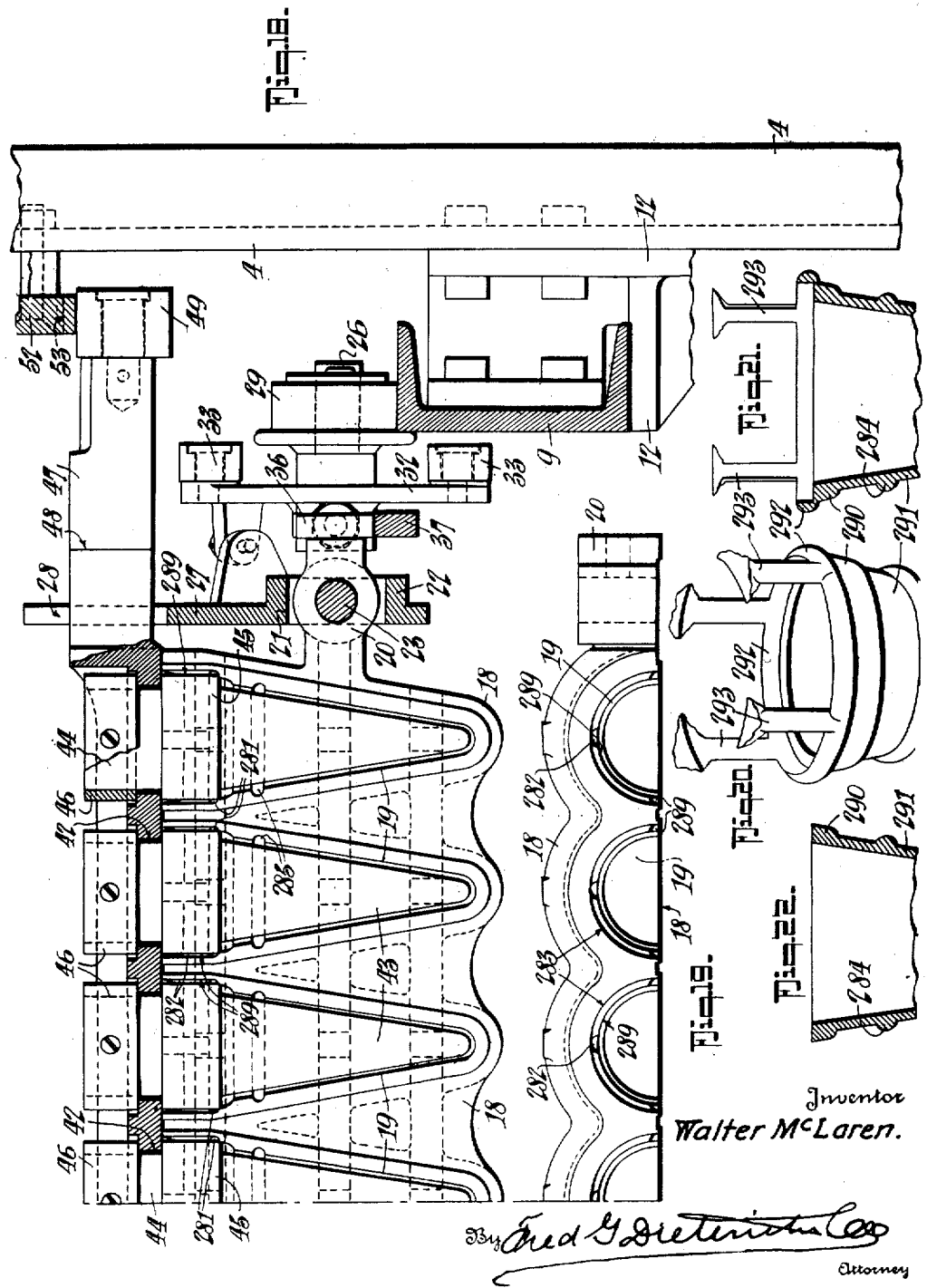
Inventor
Walter McLaren.

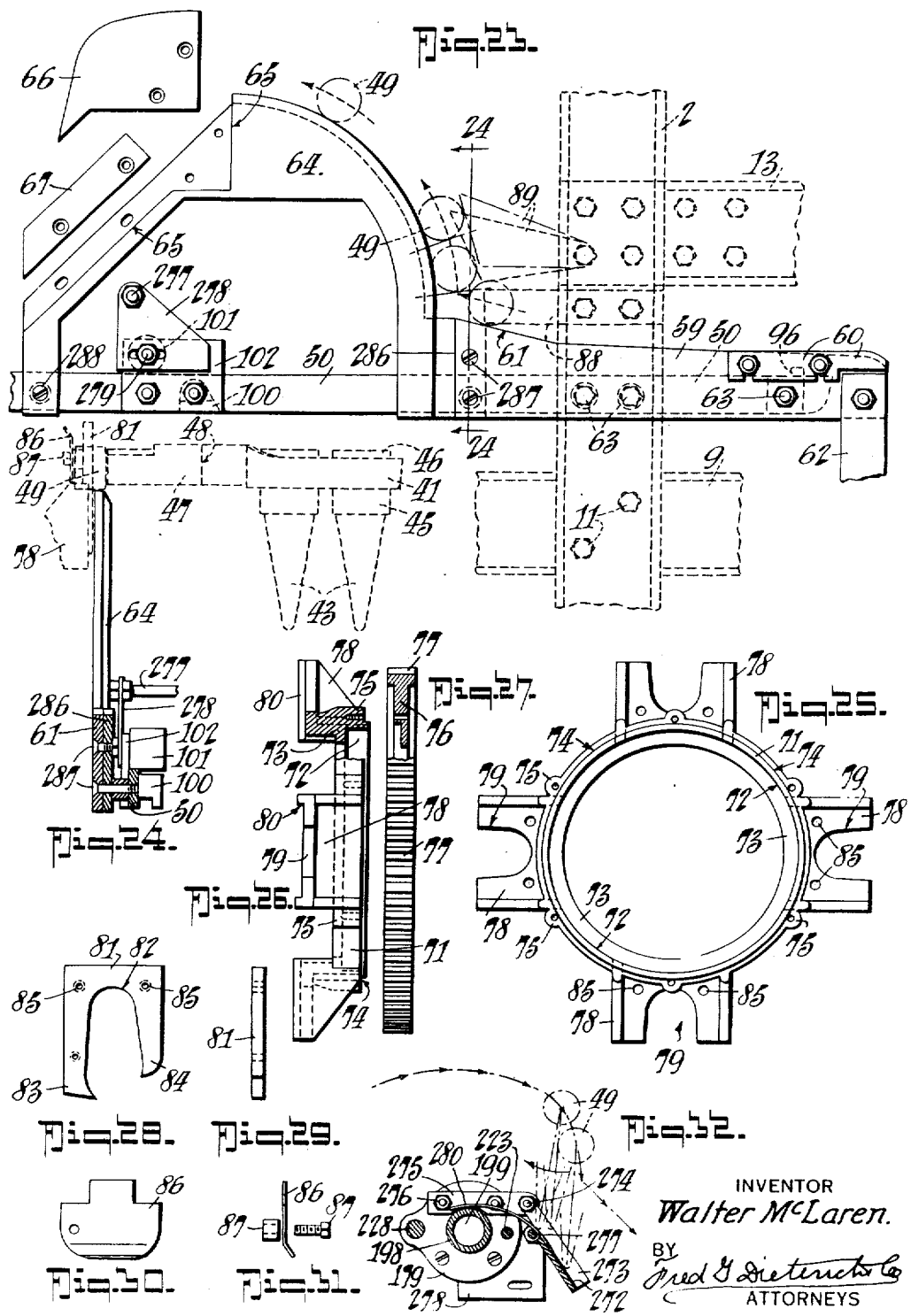

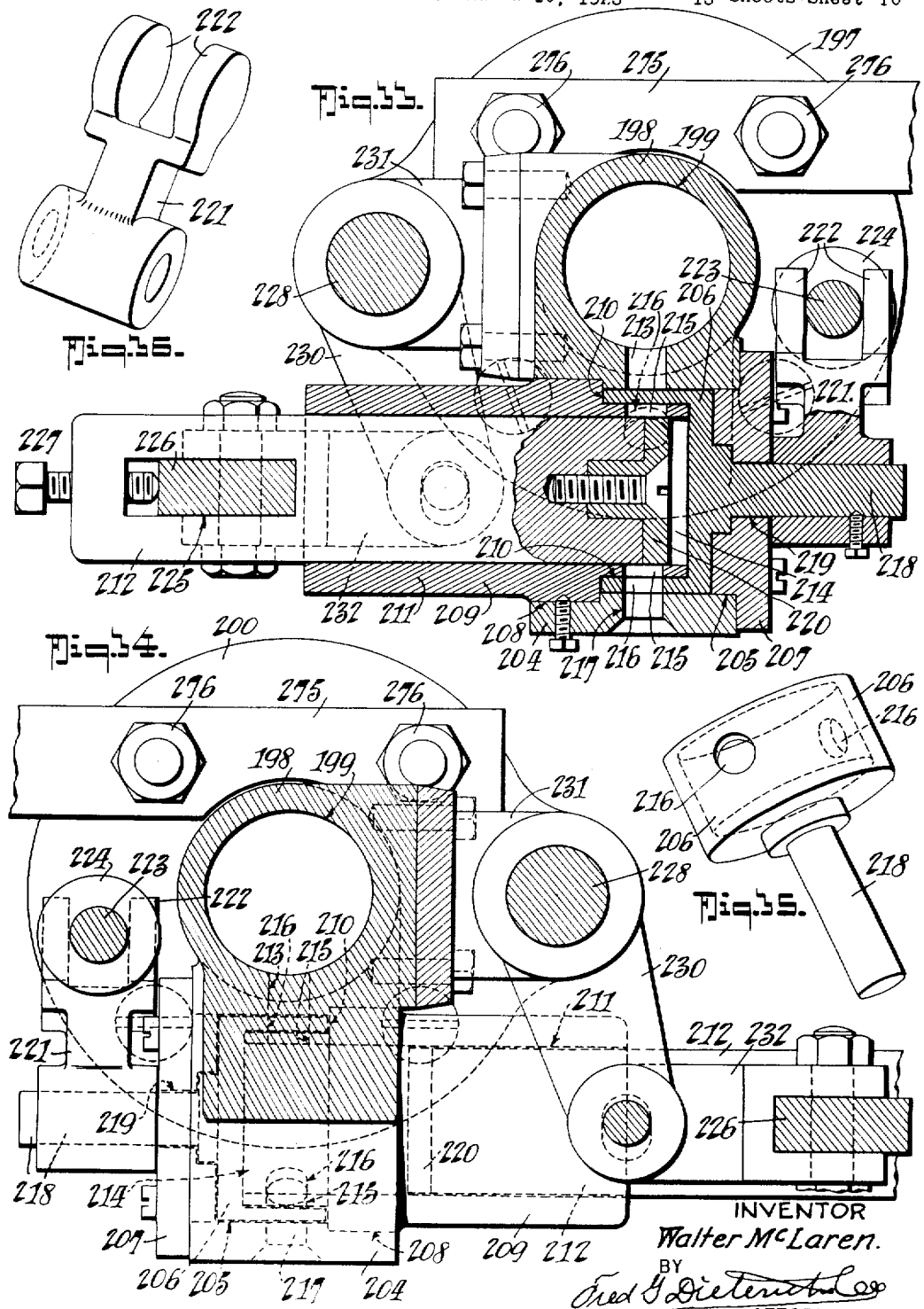

Sept 1, 1925.
W. McLAREN
1,551,998
AUTOMATIC CUP PASTRY MAKING MACHINE
Filed March 10, 1923   13 Sheets-Sheet 11
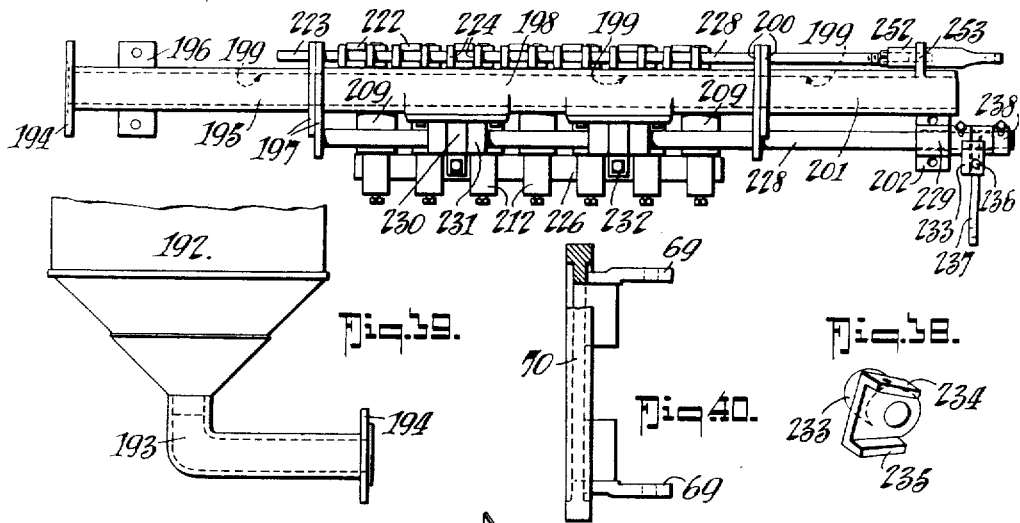
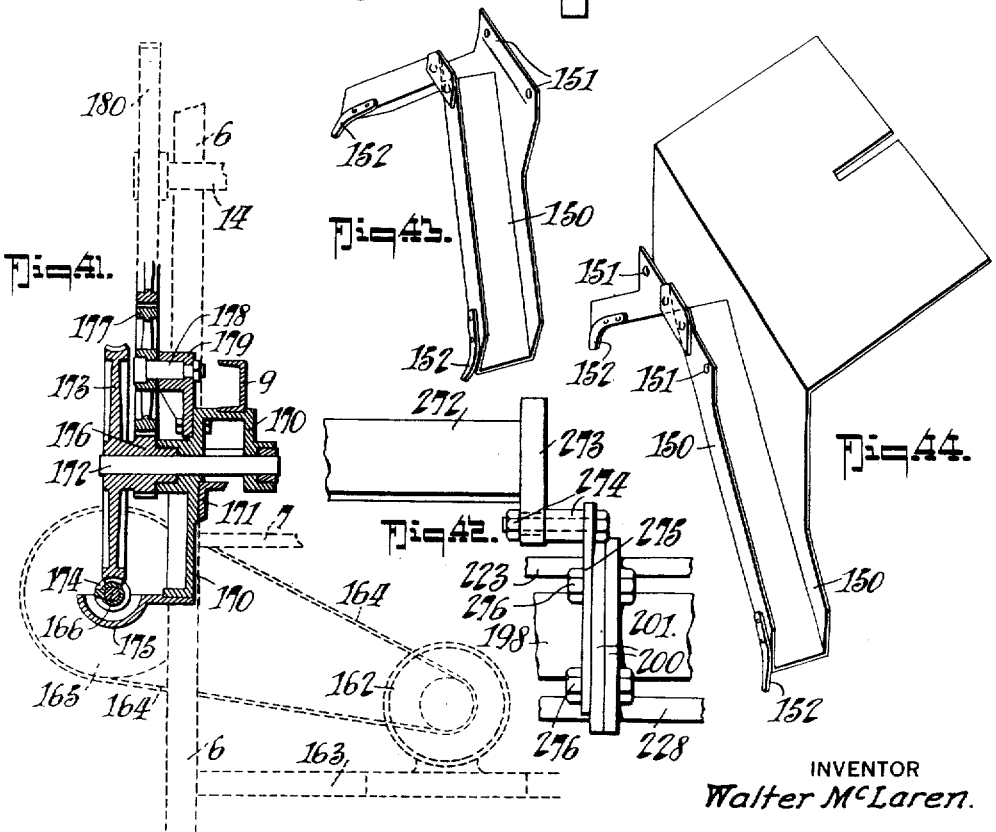
INVENTOR
*Walter McLaren.*
BY
*Fred G Dieterich*
ATTORNEYS Sept. 1, 1925.                                                              1,551,998
W. McLAREN
AUTOMATIC CUP PASTRY MAKING MACHINE
Filed March 10, 1923          13 Sheets-Sheet 12
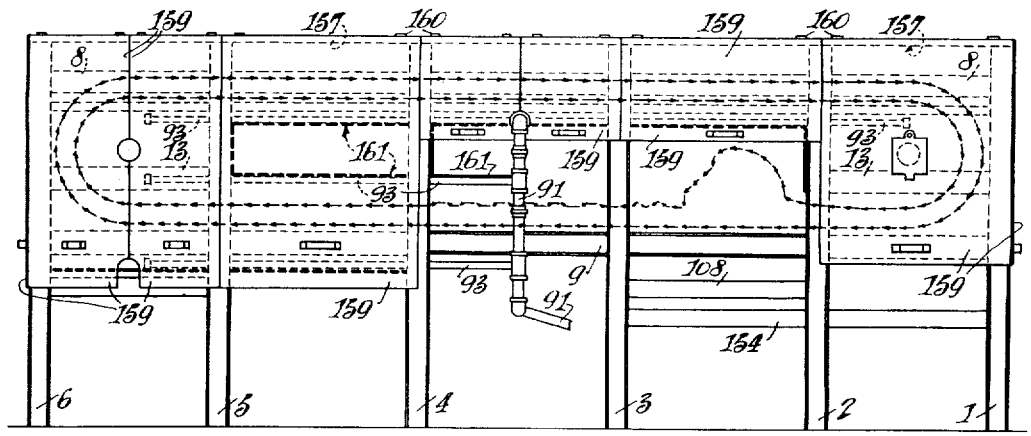
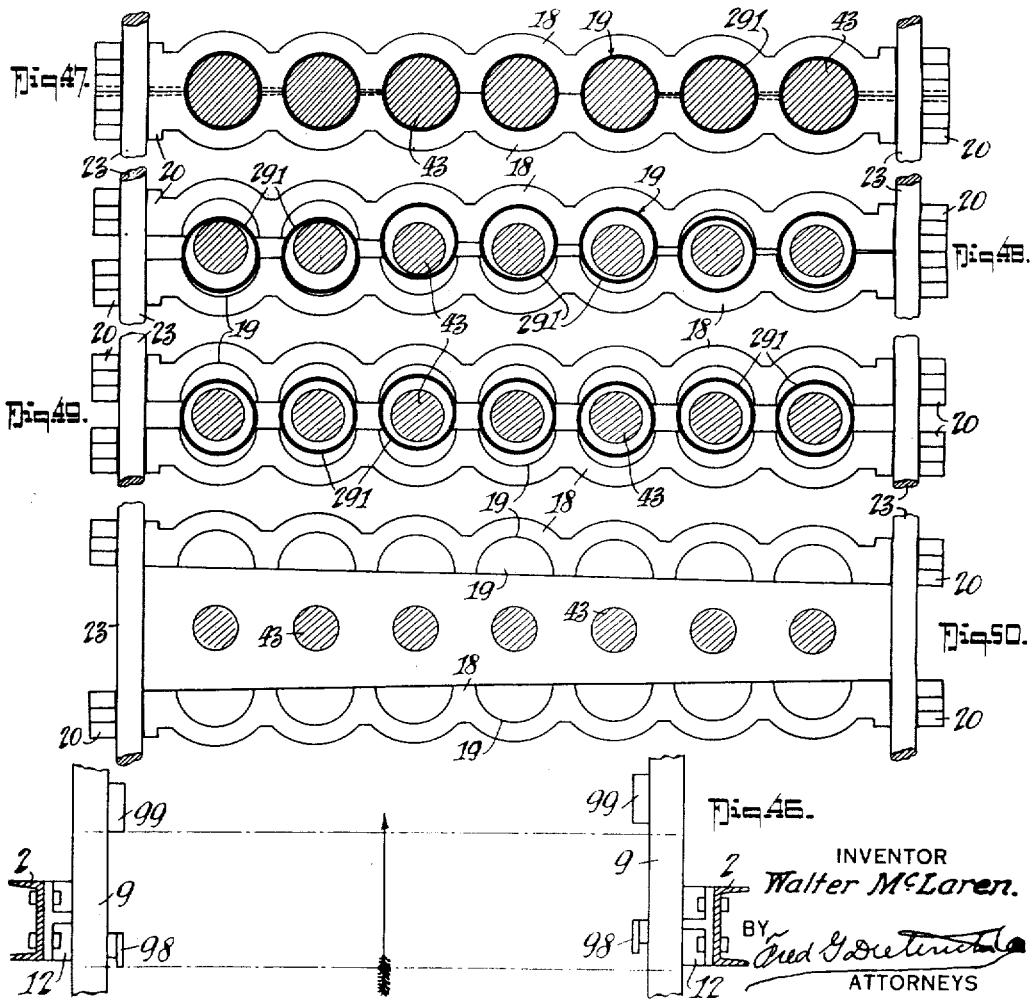

Sept. 1, 1925.
W. McLAREN
1,551,998
AUTOMATIC CUP PASTRY MAKING MACHINE
Filed March 10, 1923   13 Sheets-Sheet 13
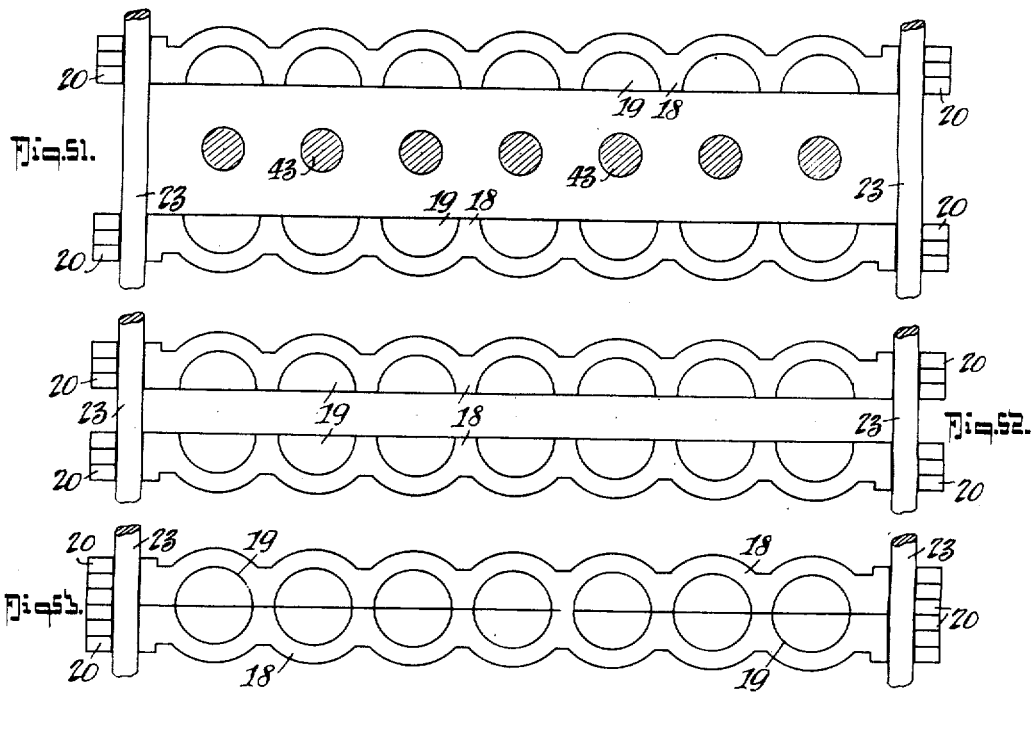
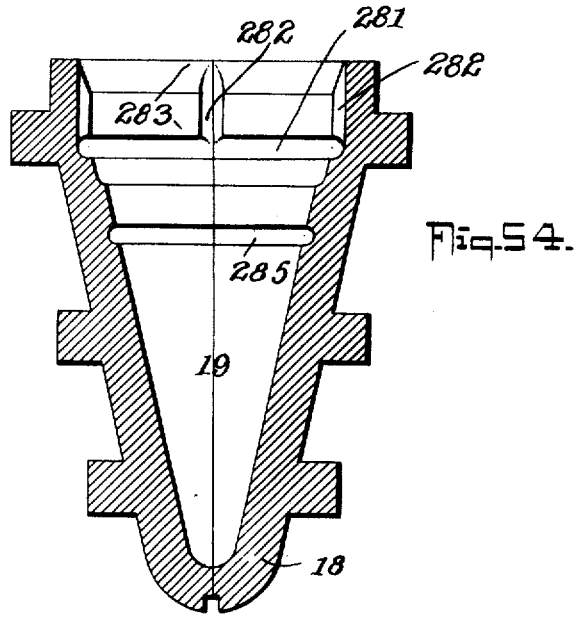
INVENTOR
Walter McLaren.
BY
Fred G. Dieterich
ATTORNEYS Patented Sept. 1, 1925.

1,551,998

UNITED STATES PATENT OFFICE.

WALTER McLAREN, OF DAYTON, OHIO, ASSIGNOR TO THE McLAREN PRODUCTS CO., OF DAYTON, OHIO, A CORPORATION OF OHIO.

AUTOMATIC CUP-PASTRY-MAKING MACHINE.

Application filed March 10, 1923. Serial No. 624,235.

*To all whom it may concern:*

Be it known that I, WALTER McLAREN, a citizen of the United States, residing at Dayton, in the county of Montgomery, in the State of Ohio, have invented certain new and useful Improvements in Automatic Cup-Pastry-Making Machines, of which the following is a specification.

My invention relates to the art of automatic cup pastry making machines, especially those used for the manufacture of ice cream cones and the invention particularly relates to the well known Bruckman type of machine (i. e. that type in which the loading, molding, baking, extracting and trimming operations are all automatically conducted in such manner that the handling of the product during manufacture is eliminated).

The present invention has for its objects to provide a machine in which the advantageous features of the Bruckman type of machines are retained and combined with other features which enable the output of the machine to be greatly increased, a saving of batter effected, and the production of a better manufactured article at a less cost of manufacture.

My present invention also has for an object the production of a machine in which the baking-mold units are secured together in the form of an endless chain which passes around sprocket or star wheels at the ends of the machine and is driven in a continuous manner instead of step-by-step fashion, thereby increasing the production of the machine. A further object is to improve the construction of the baking-mold units, the toggle mechanism for operating the female mold sections, the core-bar carry-over and the mold charging mechanisms, the trimming mechanism, the delivery mechanism, and in general to improve the construction of the machine as a whole.

With the above objects in view, the invention resides in those novel features of construction, combination and arrangement of parts, which will be hereinafter first fully described, and then be specifically pointed out in the appended claims, reference being had to the accompanying drawings, illustrating a preferred and practical embodiment of my invention, in which:

Figures 1 and 1ᴬ, when joined at the dot and dash lines A—B, and read together, constitute a left side elevation of the complete machine. Figure 1ᴬ is drawn to a slightly smaller scale than Figure 1 and the heat retaining cover plates are shown as removed in both figures.

Figure 2 is a detail vertical section of one of the handled heat retaining cover plates hereinafter referred to.

Figure 3 is a vertical cross section of the complete machine taken substantialy on the line 3—3 on Figure 1ᴬ.

Figure 4 is a detail vertical cross sectional view, on an enlarged scale, of that portion of the machine adjacent the cone extraction and loading stations thereof.

Figure 5 is an enlarged detail cross section which illustrates the cone trimming mechanism.

Figure 6 is a detail perspective view of one of the mold track channel supporting and spacer brackets, a portion of the channel being also shown.

Figure 7 is an enlarged detail right hand side elevation of carry-over mechanism and the batter pump actuating mechanism.

Figure 8 is a diagrammatic side elevation of the batter pump actuating cam and lever mechanism.

Figure 9 is a detail section illustrating the batter pump valve rod actuating levers.

Figure 10 is a detail perspective view of the combination cam, clutch and batter-pump-plunger levers' pivot bracket.

Figure 11 is a detail vertical cross section on an enlarged scale, illustrating the manner in which the cones are guided just prior to their discharge at the extracting station.

Figure 12 is a similar view illustrating the manner in which the cones are momentarily finger-held before being guided simultaneously into the trimmer tubes as shown in dot and dash lines.

Figure 13 is a somewhat diagrammatic side elevation of a pair of adjacent linked mold units and illustrates the manner in which the mold halves are acted upon by the cracking and opening cams hereinafter specifically referred to.

Figure 14 is a detail plan view of one of the mold unit link plates hereinafter again referred to.

Figure 15 is an end elevation of the solid end of one of the link plates.

Figure 16 is a similar view of the bifurcated end of the said plate.

Figure 17 is an edge view of one of the mold halves actuating levers hereinafter specifically referred to.

Figure 18 is a vertical longitudinal section of a half length of one mold unit complete with core bar and cores in place, the mold channel track and the core bar locking trackway being also indicated.

Figure 19 is a plan view of a half length of one of the mold halves.

Figure 20 is a detail perspective view of the head portion of a cone as baked in my improved machine and just as the product leaves the mold.

Figure 21 is a detail cross section of the same cone portion.

Figure 22 is a similar view of the cone after the same has been trimmed.

Figure 23 is a detail side elevation of the carry-over cam casting and the adjacent core lift trackway and the mold closing cams, the removable wear plate portions of the cam casting portions of the framing and the safety pawl, hereinafter referred to, being also indicated.

Figure 24 is a detail section taken on the line 24—24 on Figure 23, portions of a core bar and carry-over casting being also indicated.

Figure 25 is a detail face view of one of the carry-over castings hereinafter specifically referred to.

Figure 26 is a side elevation of the carry-over casting, a portion thereof being shown in section.

Figure 27 is an edge view and part section of one of the driving ring gears for the carry-over castings.

Figure 28 is a face view of one of the carry-over plate or claw members cooperative with the carry-over casting.

Figure 29 is an edge view of the claw member or plate.

Figure 30 is a face view of one of the resilient core guard plates cooperative with the claw member or plate.

Figure 31 is an edge view of the resilient guard plate, its attaching screw and spacer sleeve being also shown.

Figure 32 is a detail cross sectional view of the batter pump body and its attached core tip down-guide, and the figure diagrammatically illustrates the manner in which the core tips are guided downwardly into the mold cavities, in a manner which insures against a backward tipping of the cores.

Figure 33 is a detail cross section on an enlarged scale of the batter pump hereinafter specifically referred to, the same being taken through an individual valve chamber and the valve being shown open.

Figure 34 is a similar view, the section being taken between adjacent valve chambers and the valve being shown closed.

Figure 35 is a detail perspective view of one of the batter pump valves.

Figure 36 is a similar view of one of the oscillating levers cooperative with the batter pump valve stems.

Figure 37 is a detail plan view of the batter pump.

Figure 38 is a detail perspective view of the batter pump plunger's stroke-regulating cam.

Figure 39 is a detail side elevation of the reservoir end attachment to the batter pump body, a portion of a batter reservoir being shown thereon.

Figure 40 is a detail plan view, partly in section, of one of the ring bearings for the carry-over cam casting.

Figure 41 is a somewhat diagrammatic cross sectional view, illustrating the main drive gearing.

Figure 42 is a detail plan view of a portion of the batter pump body and of the core tip guide plate showing the manner of mounting the latter upon the former.

Figures 43 and 44 are detail perspective views of the foremost and rearmost waste receiving pans respectively.

Figure 45 is a diagrammatic side elevation of the machine frame illustrating the application of the heat retaining cover plates and illustrating by the arrow lines the course of travel of the core bar rollers and the mold rollers.

Figure 46 is a diagrammatic plan view illustrating the relation of the oppositely disposed mold cracking and opening cams.

Figure 47 is a diagrammatic horizontal section of a mold unit, the halves thereof being shown as locked to the baking position, the spring tendency of the mold halves being indicated by the dotted lines.

Figure 48 is a similar view illustrating the position of the mold halves just as the left side thereof has been cracked open and just before the right sides thereof have been acted upon by the right cracking cam.

Figure 49 is a similar view illustrating the position of the mold halves immediately after the cracking cam at the right side of the machine has functioned.

Figure 50 is a similar view illustrating the position of the mold halves just as the opening cam at the left side of the machine has completed its function, slightly preceding the full action of the right side opening cam.

Figure 51 is a similar view illustrating the position of the mold halves just as the opening cam at the right side of the machine has completed its function.

Figure 52 is a similar view illustrating the position of the mold halves during the closing thereof under the simultaneous action of the right and left locking cams.

Figure 53 is a similar view illustrating the position of the mold halves just after completion of the function of the locking cams and as the unit is passing beneath the batter pump.

Figure 54 is an enlarged cross section of a female mold unit with the core removed, to illustrate more clearly the combined steam and batter escape, equalizing pocket or groove.

In the drawings, in which like numerals of reference indicate like parts in all the figures, 1, 2, 3, 4, 5 and 6 each indicate a pair of oppositely disposed supporting standards in the nature of vertical channel beams and the said numerals are applied in accordance with the consecutive arrangement of the said beams commencing at the delivery end of the machine hereinafter termed the front end.

The vertical beams 1—6 are held properly spaced in parallel relation by upper and lower cross or tie rods 7 and the said beams are joined together to form a rigid framework by upper and lower pairs of longitudinal channel beams 8 and 9. The upper longitudinal channel beams 8 are secured, as at 10, adjacent the upper extremities of the vertical beams 1—6 and serve as a means for rigidly securing the said beams of the respective sides in proper relation. The lower longitudinal channel beams 9 are secured, as at 11, approximately midway the height of the vertical beams 1—6 to serve as a further means for securing the said vertical beams of the respective sides in proper relation, and for providing a track or guideway as will hereinafter appear. For the purpose last mentioned, the lower channel beams 9 are spaced in from the vertical beams 1—6 by the securing brackets 12, see Figures 3 and 6.

In my present invention, the molding devices are arranged in the nature of units in an endless chain which is so constructed and arranged as to traverse a simple course of travel over and under suitable heating elements and to carry and to be acted upon by mechanism which will effect the desired charging, baking and extraction of the product. For this purpose it will be observed that the standards 1 and 2 at the front end of the machine and those 6 and 5 at the rear end of the machine are more closely spaced than the intermediate standards. Each pair of the above mentioned standards are joined, intermediate of the channels 8 and 9, by short channel beams 13 which form suitable supports for the driving shaft 14 at the rear end of the machine and the driven shaft 15 at the front end of the machine. The shafts 14 and 15 are rotatable in adjustable bearings 16 mounted upon the beams 13 and have rigidly secured thereto, to turn therewith, star or sprocket wheels 17 designed to accommodate the endless chain of baking-mold units as they pass therearound in their course of travel.

The endless chain construction comprises a plurality of units each constituting a single link of that chain. Each unit includes an opposing pair of female baking-mold halves 18—18 having a plurality of cooperating mold cavities 19 and an outward extension 20 at each end thereof (see Figures 13, 18 and 19). The opposite extensions 20 of each mold half project through suitable guideways 21 formed in the respective link plate members 22 of the particular unit and the said mold halves are adapted to be moved toward and from each other at proper intervals along said slotways and upon the slide rods 23 which pass through the holes in the extensions 20. The rods 23, being fixed within the slots or guideways 21 form perfect guides for the mold halves 18—18 when the latter are being opened or closed in a manner soon to be explained. Each link plate 22, at each end of the molding unit, includes an apertured ear 24 (see Figure 14) at one end and an apertured bifurcation 25 at its opposite end; the parts are so arranged and assembled that, when the apertures of the bifurcated end 25 of each unit and the aperture of the ear 24 of the adjacent unit are brought into register and the cross or link rods 26 are inserted therethrough, a complete endless chain of units is thus formed. Each link plate 22 also includes an inward extension or flange 27 with a slot or guideway 28 formed therein for accommodating the core carrying bar in a manner later to be explained. The cross or link rods 26 are each provided at their ends with rollers 29 which travel upon the lower channel or track beams, rest in the hollows 30 provided therefor in the star wheels 17, and travel upon the upper mold-guide trackways 31 (see Figure 3) secured to the upper channel beams 8, during a complete cycle of travel of a mold unit.

A mold-halves operating lever 32 is pivotally mounted adjacent each end of each link rod 26 and each of said lever members is provided at its opposite ends with cam rollers 33 and short and long lever pivots 34 and 35. The pivot 34 is joined, by an adjustable short link 36, to the extension 20 of the mold-half nearest the particular lever 32, while the pivot 35 is joined, by a long link 37, to the extension 20 of the other or cooperating mold-half, so that, when the lever 26 is oscillated, in a manner later to be explained, the mold halves will be moved together to the locked position or separated to the cones-discharging position, as the case may be. The levers 32 each have a lateral lug 38 for accommodating a stop screw and jam nut adjustment 39 for cooperating with the stop lug 40 projecting laterally from the link plates 22.

Cooperative with each pair of mold halves 18 is a core bar 41 (see particularly Figure 18) which has a plurality (equivalent to the number of mold cavities) of bores 42 in the bottom face thereof to provide for the suitable mounting of the cores or male elements 43. The bores 42 are slightly larger than the core shanks 44 to permit such slight lateral freedom of the cores as is necessary to the proper centering of the same during the baking action. The cores are held, in their loose relation to the core-bar, by the heads 45 and collars 46. Each core-bar has end extensions 47 shaped, as at 48, to cooperate with the curved edges of the slots or guideways 28 in effecting the proper return of the cores into the mold cavities after the accomplishment of the batter charging operation soon to be described. The extreme ends of the extensions 47 are equipped with core-bar rollers 49 for engaging and being acted upon by suitable interrupted trackways, uninterrupted trackways, star or sprocket wheels, elevating trackways, and carry-over mechanism, for effecting the desired steam escape during the primary baking stages, the core-locked travel during the progressing baking stages, the core "slightly" lifted stage during the extraction of the baked product and the carrying up and over of the cores during the recharging of the female elements of the mold with batter and the replacing of the cores into the female mold cavities, etc., in a manner soon to be described in detail.

Extending along each side of the machine from a point in advance of the uprights 2 over to and including the uprights 3 is a bar 50 (see Figures 3 and 4) spaced inward of the said uprights by suitable spacer sleeves as shown. Each bar 50 assists in the support of a camel back plate or track portion 51 (see Figures 1ᴬ and 7) adjacent the uprights 3 and designed to effect an alternate raising and lowering of the cores just after they have been replaced into the recharged mold cavities for the purpose of allowing proper steam escape.

Starting at the end of the camel back track portions 51, that is, at the uprights 3, are a pair, one at each side, of lower core locking tracks 52 suitably spaced inward of the uprights 3, 4 and 5 in proper relation with the star wheels and the core bar rollers 49 to be engaged by the latter. The said lower core locking tracks 52 are curved off upward at their ends adjacent the rear star wheels (see Figure 2) to permit the proper cooperation of the guided core bar rollers with the said wheel and the said trackways are provided with cut out portions 53 in the bottom face thereof between uprights 3 and 4 so as to provide an interrupted trackway such as will permit and cause the intermittent rise and fall, respectively, of the core bar to allow desired escape of steam during the primary baking stage. The core locking tracks 52 are continuous along their lower faces as at 54 from the uprights 4 to the rear star wheel to thereby form a locking means to positively hold the cores in the proper relation to the mold cavities during the final baking of the product.

The star wheels 17 are provided with curved recesses 55 to accommodate the core-bar rollers 49, as they pass around the extremities of their course of travel, to hold the same locked in the baking relation while traversing the particular arc of the chain travel.

While the mold rollers 29 are traversing the upper mold trackway 31, the core-bar rollers engage upper core baking trackways 56 (see Figures 1ᴬ and 1) which are suitably spaced from the uprights 2, 3, 4 and 5 so as to be in proper relation to the core-bar rollers and the star wheels. The said trackways 56 are curved at their ends, as at 58, to provide for the proper pick up, in proper locked relation, of the said core-bar rollers 49.

Supplemental brace bars 57 may be fixed to the uprights 6, 5, 2 and 1, in longitudinal alignment with, but outside of, the trackways 56 (see Figures 1, 1ᴬ and 3).

Adjacent the uprights 2 and suitably spaced therefrom to be in alignment with the path of travel of the core-bar rollers 49, are auxiliary core-bar trackways 59. The said trackways are slightly inclined so as to impart a slight lift to the core bars 41 as the rollers 49 thereof move over the said trackways 59. The trackways 59 are each provided with an adjustable fore end 60, as is evident from Figure 23, and the said trackways each include a more sharply inclined heel portion 61 adapted to direct the core-bar rollers onto the carry-over mechanism soon to be described. A bracket 62 supports the fore end of each trackway 59 and the said trackways are further secured to the support bar 50 and the uprights 2, as at 63, (see Figure 23).

As the core-bars reach the end of the trackway 59 they have completed their function of a complete baking operation and have completed their function as a cone stripping element and they must be removed from and carried over their cooperative mold cavities while the same are being recharged with batter from the batter pump soon to be described. As the core bar rollers are moved up the incline 61, by reason of the relation of the core-bar extensions 47 and the slots 28 of the mold unit link plates 22, they are picked up and carried over the aforesaid pump mechanism by a carry-over mechanism, soon to be described, and while the core-bars are being so carried over, the rollers 49 thereof ride upon the lift-over cam trackway 64 so designed and mounted as to effect the proper guiding of the core bars up over the pump mechanism and down again into proper cooperation with the recharged mold cavities 19 (see Figure 4). The lift-over trackway 64 has a shouldered heel portion 286 secured by screws 287 to the trackway 59 to be supported therewith from the bar 50, as at 63, and the rear or core bar delivery end of the said trackway is also secured at 288 to the bar 50 by a screw and spacer collar.

The carry-over trackways 64 have cut out portions 65 to accommodate removable wear plate members 66 and 67 adapted to be bolted by countersunk shanks to the said trackway. The member 67 is adapted to slight adjustment, due to the elongation of the bolt holes in the trackway 64 as shown, to insure proper return of the core bars to proper relation with the mold units as they are permitted to gravitate down the incline formed by the said plate 67 (see Figures 4 and 23).

At each side of the machine, located between the uprights 2 and 3, is a supporting bracket 68 the one at one side being supported upon a bearing bracket 125 (see Figure 3) in turn supported by the adjacent channel 9 and the short support angle 108 while the one at the other side is supported by the bearing bracket 123 which is in turn supported by the adjacent channel 9 and the supporting angle 154 at that side of the machine, (see Figures 1ᴬ, 3 and 7). Each bracket 68 is shouldered at its upper end to provide for fixedly securing thereto the supporting lugs 69 of a ring bearing-member 70 and from description to follow it will be seen that the brackets 68 also support the batter pump mechanism in such a manner as to locate that mechanism within the hollow center of the ring bearings 70 so that both ends of such pump mechanism may project therefrom without interference with the core bar carry-over mechanism.

The carry-over rings or castings are designated 71 (see Figure 25) and the said castings are each provided with an annular bearing portion 72 to cooperate with and rotate upon the ring bearing 70 (see Figure 7) and an annular flange 73 for abutting the inner face of said bearing portion 72 to prevent lateral displacement outward. The rings 71 each have an annular step 74 and tapped gear affixing ears 75, the latter being adapted to receive the ring gear securing screws which effect the rigid mounting of the short spokes 76 of the ring gear 77, the former being designed to act as an aid in mounting by reason of the cooperation thereof with the shouldered portions of the said spokes 76 (see Figures 26 and 27). The shouldered spoke extensions act as lateral abutments for the ring bearing 70 to prevent lateral displacement inward, thus cooperating with the flange 73 to hold the casting 71 in proper rotative relation upon the ring bearing to be rotated by the ring gear 77 in a manner later to be explained.

Each carry-over casting 71 has a plurality of radial extensions 78 (four being shown) and these are provided in their flat faces with U-shaped cut out portions or slots 79 and with locating flanges or ribs 80 for locating the carry-over claw members 81 (see Figures 25 and 26).

The claw members 81 are also provided with U-shaped cut out portions or slots 82 which provide, on each member, a pair of core-bar roller engaging fingers, i. e., a long or lifting finger 83 and a short or dropping finger 84, each being turned inward slightly to effect a proper cooperation with the core-bar rollers during the pick up and drop movement of the core-bars, as presently again referred to. The claw members 81 are bolt connected to the carry-over ring, as at 85, by bolts with countersunk shanks.

Resilient lateral guards (see Figures 1ᴬ, 3, 4, 7 and 24) are fixed to the claw members 81 to cooperate with the said members during the carry-over action thereof to prevent lateral displacement of the core bars and the said guards are in the nature of flared plates 86 of thin metal shaped (see Figures 30 and 31) and are joined, by a single screw and spacer collar connection 87, to the individual claw fingers 83.

Each upright 2 has fixed to the inner face thereof, to project rearwardly therefrom and in proper relation to the portion 61 of the trackway 59, a lateral guard plate 88 which serves to prevent lateral displacement of the core bars as they move upward and into position for being engaged by the pick up fingers 83 (see Figure 1ᴬ).

A back drop guard pawl 89 is pivoted to each upright 2 and lies in the path of travel of the core bar rollers 49 so as to engage the same in the manner illustrated in Figure 23 to overcome positively any possible tendency of any core bar to drop back off of the pick up fingers 83.

Through the main gas and air pipe 90 and the supplemental piping 91 the gas and air mixture, burned to produce the heat necessary to properly bake the cones, is supplied to a plurality (three being shown) of manifolds 92 which are in communication with three planes of burner tubes 93 which are supported upon grooved plates 94 fixed to the respective uprights 2, 3, 4 and 5. One plane of the burner tubes lies just beneath the core-bars on the upper course of travel and direct their flames against said core-bars. Another plane of burner tubes lie just above the core-bars on the lower course of travel and direct their flames against said core-bars. The third plane of burner tubes lie beneath the female mold units on the lower course of travel and direct their flames against said mold units. All of the burner tubes are properly equipped with burners 95.

A safety mold closing cam finger 96 is fixed to the fore end of each bar 50 in proper position so as to engage any mold actuating lever 32 which might, from some unusual circumstance be travelling unlocked and lock the same to thereby make proper action thereupon, by the cracking and opening cams, certain.

It will be readily understood from the foregoing description and from the drawings, that the chain units travel truly parallel, that is, the link plates travel parallel and the link rods 26 travel parallel so that both center points of any particuar link rod 26 will pass any given point on the course of travel simultaneously. While this is also true as regards the mold units when locked, it is not so during the opening of the molds during the extraction of the cones, during which stage the mold halves do not open in parallel relation with each other. The mold halves are caused to open in a sort of zigzag manner, the purpose for which will presently appear.

To accomplish the above purpose, I provide each machine side with a cracking cam 98 and an opening cam 99, each cooperating pair of which are so positioned with relation to each other as to effect first the slight cracking of the mold halves, to free the cones, then the full opening of the mold halves to discharge the freed cones. The cams 98 and 99 are fixed to the inner face of the channels 9 and project into the path of travel of the cam rollers 33 of the levers 32 (see Figures 3, 4, 11 and 13). By reference to Figure 46, it will be readily seen that the cams 98 and 99 at the left side of the machine are slightly in advance of those on the right side of the machine so as to engage the rollers 33 of the left actuating lever in advance of the engagement of the right cams and lever so as to effect the opening of the mold in the manner clearly illustrated in Figures 47 to 51.

Safety cam members 97 (see Figures 11 and 13) may be used as a precaution to prevent back lash of the levers 32, due to the spring tendency of the mold halves and as a supplement to the action of the staggered cam arrangement.

It should be understood that the opposing faces of the female molds, when the molds are unlocked, do not lie in true planes, but the mold halves are curved slightly so that in bringing the opposing faces together, they will engage at the center before coming together at the ends, whereby always to keep a tension on the toggle mechanism which holds the ends of the mold-halves locked together.

The mold-halves actuating levers 32 have their cam rollers acted upon by the cams 100 and 101 which act practically simultaneously to effect the closing and locking of the mold halves just as the new charge of batter from the batter pump is about to be injected into the mold cavities 19. The cams 100 and 101 are secured to the bar 50 and the plate 102 secured thereto and in position for being engaged by the cam rollers 33 of the levers 32, (see Figures 4, 23 and 24).

A cone guide plate 103 is mounted, through the medium of the attaching straps 104 fixed to the bracket 12 on the uprights 2, upon a plane just below the mold bottoms so as to be just clear of the travel thereof. The said plate is designed to receive the tips of the cones as they begin to drop, as the molds are opening, to guide the same, and cause them all to drop off the edge of the guide plate simultaneously whether the initial drop of all the cones was simultaneous or not. To this end the plate 103 is made of a width approximately the same as that of the uprights 2 (see Figures 3, 4, 11 and 12).

The mold halves start their full opening action as the center line of the mold units reach the center of the guide plate 102 so that all of the cones are free to drop together as they reach the rear edge of the said plate 103, where they fall simultaneously toward the downwardly inclined delivery chutes 105 down which they ultimately slide into the trimmer tubes later explained in detail. The chutes 105 are rigidly secured, at their upper ends to a square cross bar 106, screw connected at its ends to the channels 9, and at their lower ends to a cross angle bar 107 fastened at one end to the upright 2 and at the opposite end to the short supporting angle 108 (see Figure 3).

Secured at its ends to the uprights 2 and in proper relation with the chutes 15 is a trimmer base having individual trimming tubes 110 in proper position and alignment for receiving the cones as they slide down the individual chutes 105.

Other delivery chutes 111 are secured to the trimmer base to hang beneath the same and the said chutes are designed to receive the cones after they have been trimmed and deliver them onto the offtake conveyor 142 for proper packing.

The trimmer base 109 acts as a substitute for one of the brace rods 7 making a brace unnecessary between the uprights 2 (see Figures 4 and 12).

The cones are not permitted to drop into the trimmer tubes 110 immediately upon their leaving the plate 103, but are held momentarily by fingers 112 which project between and at the outside of the chutes 105. This is designed to further insure the simultaneous and proper delivery of the cones to the trimmer tubes and arrest the fall of the cones.

The fingers 112 are rigidly mounted upon a cross square bar 113, the trunnions of which oscillate in bearings 114 secured to the bottom face of the channels 9 (see Figures 11 and 12).

One of the fingers 112, adjacent the center of the row, is provided with a pendant lever portion 115 which is pivoted to an actuating lever 116 slotted as at 117 to straddle the cam shaft 121. The lever 116 is provided at its rear end with a cam roller 118 in operative relation with the cam groove 119 of the actuating cam 120 so that rotation of the cam shaft 121, in the direction indicated by the arrow on Figure 12, will result in the action of the fingers 112 in the manner indicated in dot and dash lines on Figure 12.

The cam shaft 121 has bearing, as at 122, at one end in the bracket 123 before mentioned and, at its other end, as at 124, in the bracket 125 also before mentioned (see Figure 3).

On vertical planes just outside of the outermost chutes 105 are a pair of trimmer arm actuating cams 126, identical in construction with that of the finger actuating cam 120 but fixed to the shaft with the axis of throw timed slightly behind that of the cam 120 so as to cause the fingers 112 to be actuated and the cones dropped thereby in sufficient time to be properly seated in the trimmer tubes 110 before trimmer arm descends to trim the same (see Figures 3, 4 and 5).

Cam rollers 127 mounted one on the short crank end of each bell crank trimmer arm lever 128 loosely pivoted on the shaft 134 cooperates with the cam grooves of the cams 126 to effect the proper raising and lowering of the trimmer arms, as hereinafter stated.

Spacer collars 129 and 130 are used to hold the levers 116 and 128 respectively to their proper positions upon the shafts 121 and 134.

Just after the parts have taken the position indicated in the dot and dash lines on Figure 12, the cams 126 will have brought down the trimmer bar to trim the cones as follows: The long arm of the bell crank levers, pin and slot connected at 131 to the trimmer link arms 132, would pull those arms downward by reason of the flexible connections of the threaded shanks 133 at 136 with the pivoted heads 137 of the trimmer arms 135 (see Figures 4 and 5).

The trimmer arms 135 are fixed to a cross shaft 138 which has end bearings in the bearings 139 mounted upon the supporting angles 154.

The trimmer arms 135 are joined by the trimmer bar 140 which has secured thereto the individual trimmer heads 141 which cooperate with the trimmer tubes 110 to trim the cones, as is clearly illustrated in Figure 5.

As the cones are trimmed they fall upon the delivery chute 111 and slide thereoff and onto the offtake conveyor 142 which is fixed between and to a pair of chains 143 which take over small sprockets 144 fixed to the stub shaft ends 145 driven into the conveyor drum around which the conveyor 142 takes, and the said shaft ends 145 are journaled in end bearings 146 fixed to the uprights 2.

A drive sprocket 147 is fixed to one of the stub shafts 145 and the same is driven, through the chain transmission 148, from the sprocket 149 on the shaft 134.

For catching the waste as it is thrown off at the trimmer heads, I provide a pair of waste pans 150 fixed at 151 to the trimmer base 109 to hang therefrom and to receive the waste and direct it downwardly and laterally out of the conveyor 142 (see Figures 3, 4, 5, 43 and 44).

Each pan 150 has, at each end thereof, a finger 152, downturned to engage the conveyor chains 143. The engagement of the fingers 152 with the chains 143 effects an agitation of the pans 150, such as will insure the most effective discharge therefrom of the waste collected thereby.

I also provide a blower pipe connection 153 in the nature of a cross pipe mounted across from leg 2 to the opposing leg 2 and in proper relation to the trimmer cups 110 so that the air ejected from the apertures of the pipe 153 will effectively blow away any accumulation of dust around said trimmer heads (see Figures 1A and 5).

As the cones pass onto and up the offtake conveyor belt 142, they are guided by any suitable guide incline 155 over which the said conveyor 142 is caused to pass. The guide incline 155 may have its end, adjacent the machine frame, suitably supported upon cross angles 156 fixed to the uprights 1 for that purpose and also to provide suitable support for the lower ends of the delivery chutes 111.

To provide for the desired heat retention adjacent the baking places, I provide heat retaining cover plates so constructed and arranged as to convert desired areas of the machine into ovens through which the endless chain of mold units pass to effect the proper baking of the molded product. To this end, I provide a top border, entirely surrounding the machine, of small angle iron 157 (see Figure 45) the said border angles being supported upon and secured to the securing brackets 158 fixed to the upper extremities of the uprights 1, 2, 3, 4, 5 and 6. Side and end cover plates 159 of sheet metal covered asbestos are removably hung from the angles 157 by hooks 160 fixed to said plates and each side plate section is provided with a handle to facilitate the ready removal of the respective plates when desired. The plates 159 are all removable. Other plates 161 are fixed to the framework, in any desired manner, and in such position as will not interfere in any manner with the functions of the various mechanisms and where they will most effectively serve their purpose of retaining the heat desired. A detail cross section of one removable section 159 is shown in Figure 2 and in Figure 45 is clearly illustrated, in diagram, the relative positions of all the said plates 159 and 161.

Power is applied to the various mechanisms as follows: From the motor 162, supported upon the framing 163, power is supplied, through the belt transmission 164 to driving pulley 165 loosely mounted adjacent the end of a worm drive shaft 166, journaled in suitable bearings 167 secured to the uprights 3, 4, 5 and 6 at one side of the machine. A clutch member 168, controlled by the clutch lever 169 serves to apply or stop rotative connection between the shaft 166 and pulley 165.

Through the worm 174 (mounted upon the worm shaft 166 and within the bearing 175 secured to the bottom of the bracket 170 which is in turn fixed to the channel 9 and the supporting angle 171) a large diameter worm wheel 173 is driven. The worm wheel 173 is fixedly secured to a stub shaft 172 which has suitable bearing in the bracket 170. A small pinion 176 (see Figure 41) is also fixedly secured upon the shaft 172 to rotate therewith and to impart motion to a larger spur gear 177 loosely mounted upon a stub shaft 178 fixed in a bracket 179 secured to the main drive bracket 170. The gear 177 meshes with the large diameter gear 180 upon the driving star wheel shaft 14. From the foregoing, with reference to Figures 1 and 41, it is readily apparent that when the motor 162 is running and the clutch 168 is thrown in to lock the shaft 166 and pulley 165 to rotation, rotation is imparted to the endless chain of mold units, to cause them to follow the course of travel indicated by the arrows on Figure 45, through the rear star wheels 17, the gears 180, 177, 176, worm wheel 173 and worm 166.

For supplying power to the various other mechanisms, I provide the fore end of the shaft 166 with a worm 181, positioned in the bearing 182 secured to the bottom face of the left bearing bracket 123, and the said worm 181 meshes with a worm gear 183 loosely mounted upon the shaft 134 but which is secured to rotate on said shaft through the medium of a plate 185 keyed to the said shaft 134 and rigidly but adjustably secured to the said gear 183, as at 184, (see Figures 1ᴬ and 3). The adjustable connection 183, 184, 185 provides for slight timing adjustments of the mechanism driven thereby, as may be desired. The one end (see Figure 1ᴬ) of the shaft 134 has bearing in lower part of the bracket 123, and the other end thereof has suitable bearing in the end bearing 186 secured to the short support angle 108 (see Figure 3). The shaft 134 has keyed thereto, between portions of the bracket 123, a spur gear 187, of which the driving sprocket 149 is an integral part, which meshes with a spur gear 188 keyed to the cam shaft 121, which latter shaft is provided, adjacent its ends, with a pair of small driving pinions 189 which are adapted to mesh with idler pinions 190, loose upon stub shafts 191 secured to the brackets 68, and which are adapted to transmit rotary motion to the core-bar carry-over drive gears 77. From the foregoing description, with reference to Figures 1ᴬ and 3, it will be readily apparent that rotative power is applied to the carry-over drive gears 77—77 as follows: through worm 181, worm gear 183, gear 187, gear 188, gears 189—189 and from gears 190 to the said carry-over drive gears.

The clutch construction 248, 249, 250 (see Figure 3) allows the complete cutting out of the batter pump so that the batter feed may be cut off from pump to mold to enable the machine to be completely cleaned of the baked product when desired.

The cam adjustment 236 allows for the adjustment of the amount of batter injected into all of the molds simultaneously by reason of the adjustment thereby of the stroke of all the pump plungers simultaneously, as will presently appear.

Further means is provided for adjusting the individual pump plunger strokes, as will later appear.

Batter is supplied to the batter pump from any suitable reservoir 192 which may be supported upon a spout 193 which is flange-connected, as at 194, to an end duct 195. The said duct 195 is provided with a foot portion 196 adapted to be rigidly secured upon the upper face of the adjacent supporting bracket 68 and the said duct 195 is flange-connected, as at 197, to the main pump body section 198. An end duct 201 is also secured to the main pump body 198, as at 200, and the said duct 201 includes a pendant securing foot 202 adapted to be rigidly secured upon the upper face of the adjacent supporting bracket 68. The aforesaid ducts 193, 195, 201 and body 198 are provided with bores 199 in register with each other and with the reservoir 192 (see Figures 3, 37 and 39). The bore 199 of the duct 201 is closed by a closure plug 203.

Pendant from the main pump body section 198 is a plurality (seven being shown, one for and in alignment with each mold cavity) of valve cylinders 204, bored at 205 to accommodate the oscillatable hollow cylindrical valve body 206 and the hub of the end closure cap 207. The said valve cylinders 204 are counterbored, as at 208, to accommodate the heads of the plunger cylinder sleeves 209 which latter are shouldered and reduced, as at 210, to form relatively thin cylindrical extensions projecting into the hollows of the valves 206 to thereby permit the batter ejecting plungers 212, slidable in the bore 211 in the sleeves 209, to pass back almost to the cylinder wall formed by valve 206. The sleeves 209 are secured in the cylinders 204 in any suitable way.

Outlet apertures 213 form passes between the body bore 199 and the individual batter charge chambers 214, and each sleeve of cylinders 209 which project into the valves 206 is provided with pairs of diametrically opposite registering apertures which are in constant register with the inlet apertures 212 and outlet apertures 217 in the bottom of the casings 204. The valve bodies 206 are each provided with a pair of apertures 216 adapted at intervals to open or close communication between either the bore 199 and the chamber 214 or the chamber 214 and the mold cavity passing beneath the same.

Each valve body 206 has a valve stem 218 adapted to project through the aperture 219 formed in each cap 207 and an actuating lever 221 is secured upon each valve stem for properly oscillating the said valve at intervals. Each valve lever 221 has a forked head formed by a pair of straddling fingers 222 adapted to straddle the valve actuating rod 223, and the said rod 223 is provided with a plurality (two for each valve lever 221) of abutments 224. The straddling fingers 222 of each lever 221 straddle the rod 223 between a pair of the abutments 224 on the said rod for the purpose of being engaged by said abutments to thereby oscillate the valve as the lever 223 is reciprocated in a manner later to be explained.

Each pump 212 has a packer washer 220 removably secured to the inner end thereof for properly engaging the cylinder bore 211 in an approximately fluid-tight relation and the said plungers 212 are also each provided, adjacent the outer end thereof, with a longitudinal slotway 225 to accommodate a long cross bar 226 which passes through the slots of all of the said plungers for the purpose of actuating all of the said plungers simultaneously in a manner soon to be explained. Set screws 227 cooperate with the various slotways 225 and the bar 226 to enable an individual adjustment of any particular plunger by allowing more or less lost motion therein.

For properly actuating the plungers 212 simultaneously through the cross bar 226, I provide a rocker shaft 228, passing through apertures in the enlarged ears of the main pump body section flanges, having bearing in an enlargement 229 of the foot portion 202 and in suitable bearing brackets 231 secured to enlargements on the main pump body section 198, as is clearly indicated in Figures 33, 34 and 37. A pair of cranks 230, each located between the ears of the bearing brackets 231 are joined through links 232, with the cross bar 226, so that when the shaft 228 is oscillated, the bar 226, carrying with it all of the plungers 212 simultaneously, will be reciprocated to suck in a charge of batter or to eject a previously sucked in charge as the case may be.

A cam member 233 is fixed upon the shaft 228, adjacent the one end thereof, and is designed to effect the desired rocking of the said shaft for the purpose of actuating the pump plungers in a manner to be explained. A crank arm 237 is loosely mounted upon the shaft 228 between the cam member 233 and a fixedly mounted retaining collar 238 (see Figures 7 and 37) and the said lever extends forwardly from said shaft and lies between an upper flange 234 and a lower flange 235, both integral with and projecting from the cam member 233, and is adapted to be oscillated, in a manner soon to be explained, to cause the same to engage, alternately at fixed intervals, the lower flange 234 and the screw adjustment 236 which projects through the threaded tap in the upper flange 235 (see Figures 7, 8, 37 and 38).

The crank 237 is actuated by a link 239 pivoted thereto and to the end of a cam actuated lever 240, pivoted at 241 to a combination pivot bracket 242 which is secured at 243 to the short supporting channel 108. The cam lever 240 is provided with a roller 244 adapted to engage and be acted upon by the cam groove 245 of the cam 246, to rock the various levers and reciprocate the pump plungers at just the proper interval and to the proper degree (see Figures 7 and 8).

The cam 246 is loosely mounted adjacent one end of the shaft 134 and is held upon said shaft by the collar 247 fixed upon the shaft end and the said cam 246 has a clutch face 248 for being engaged by the clutch member 249 which is splined to the said shaft 134. The clutch member 249 is moved into or out of driving relation with the cam 246 by the clutch lever 250 which is pivoted, as at 251, to the combination bracket 242 (see Figures 3 and 7).

The valve actuating rod 223 which has slide bearing in apertures therefor in the flanges 197 and 200 of the pump body is provided at one end with an enlargement 252 (see Figure 37) into which the said rod threads and to which the same is fixedly clamped by a jam nut as shown, by which means it is possible to make very accurate adjustment of the valve movement.

A cam actuated valve operating lever 254 is suitably pivoted upon the upright 2 and upon a suitable spacer as at 255 and the said lever is provided with a cam roller 256 adapted to be engaged by the cam flange 257 of the cam 246 to be lifted thereby at suitable and regular intervals for actuating the valves as presently explained.

A vertical short lever 258 is pivoted at its lower end to the lever 254 and at its upper end to one end of a bell crank lever 259 pivoted at 260 to the pump support bracket 68. The other end of the bell crank 259 is link-connected, as at 261, to the lower short end of a straight lever 262 pivoted at 263 to the bracket 264 secured, as shown, to the flange of the said bracket 68 and the upper long end of the said lever 262 is link-connected, as at 265, to the flattened end of the enlarged portion 252 of the valve rod 223 (see Figures 7, 8 and 9). By referring to the foregoing description and the figures of the drawing mentioned, it will be readily apparent that when the cam flange 257 engages the roller 256, and thereby raises the lever 254, the various levers will act as indicated by the arrows on Figure 9 to thereby momentarily close off valve communication between the batter supply bore 199 and the individual batter charge chambers 214 and to similarly open communication between the chambers 214 and the discharge orifice 217. As the roller 256 drops off the flange 257 the parts are quickly returned to normal when the valve will be opened to communication with the batter duct 199 and closed to communication with the discharge orifice 217 and at which time one arm of the bell crank 259 will abut the bracket 68, as at 266, to form a stop against further movement of the various levers.

For insuring a positive and quick return of the parts to normal as above described, I provide an auxiliary lever 267 also pivoted at 241 to the bracket 242, and the said lever 267 is link-connected at 268 to the lever 254 and is also equipped with a cam roller 269 which is engaged by the cam flange 257 just as the roller 256 is dropping therefrom and thereby, and by the aid of the weight 270 pendant from the end of the lever 254, the various levers are quickly and positively returned to the normal position.

A spring 271 may also be used if found desirable to aid the proper return of the levers and the same may be secured to the top of the lever 267 and to an upright 3.

By reason of the function of the weight 270, the spring 271, or both as the case may be, the levers are quickly snapped back to their normal position to effect the proper return of the valve ports to their normal position, absolutely insuring a positive, measured charge of batter into the mold cavities and without any possibility of dripping of the batter.

When the pump parts and levers are in their normal position, the plungers are extended as shown in Figure 34, with the valves open to communication between the batter duct 199 and the chambers 214 and closed to communication with the discharge orifice 217.

When the pump actuating levers are acted upon, the valves are moved first and are moved to and held momentarily in that position where the valve has closed communication between the batter duct 199 and the chamber 214, at which moment the plungers will be forced in to eject the charge of batter (previously sucked into the chambers 214, by the same plungers, out of the said chambers 214) through the orifices 127 and into the mold cavities below.

For effectively guiding the core tips as they descend over the carry-over trackways 64, 66, 67 to re-enter the mold cavities 19, I provide a core tip guide plate 272, secured to a pair of pendant arms 273 pivoted upon spacer studs, as at 274, to a pair of brackets or arms 275 fixedly secured at 276 to the flanges 197 and 200 of the main pump body 198. The pivoted and pendant frame 272, 273—273 is supported at an incline, upon a cross rod 277 secured at its ends in bracket plates 278—278 adjustably secured to the outside of the cam carrying plates 102, whereby the incline of the said frame may be given slight adjustment. The frame may also be provided with an auxiliary sheet metal guide plate 280 to insure against the possible back swing of a core-bar due to the rotation of the carry-over ring 71 (see Figure 32, also Figures 4, 23, 24 and 42).

It is to be understood that as the core bars are lifted and guided over the cam trackways 64 and 66, and start downwardly over the trackway portions 67, a tendency for the cores to tip backwardly is exerted, due to the relation of the core bar rollers 49 as they rotate over the said trackways under the guiding influence of the claws 83 or 84. Any excessive degree of backward tipping due to the tendency just explained is guarded against by the application of the guard plate 280. It will be readily apparent that no tendency to tip forwardly is present during the pick-up-and-carry-over operation due to the action of the rollers (rotation) while being guided over the trackways hereinbefore mentioned.

The female molds have the die portions of the mold cavities 19 well below the top surface of the mold and from the top of the die portions of the cavities, the cavities are provided with cylindrical vertical walls which extend upwardly from the top of the die cavities 19 to the top of the mold and constitute necks 289. At the mouths of the cavities, the molds are beveled off or flared at 283 to guide the core heads 45 into the cylindrical neck 289 of the cavities in which the heads have a batter-tight fit. At the junction of the cylindrical portions of the mold cavities with the die or molding portions thereof, is placed a ring-groove 281 which serves as a steam equalizing pocket and as an overflow chamber for batter, there being provided also a number of shallow vertical steam and gas batter relief grooves 282 (see Figures 11, 18 and 19) in the necks 289. This construction allows for the escape of steam, with more or less freedom during the initial part of the baking period before the cores are forced down to close off the ring-grooves 281 (see Figure 18) and work that portion of the batter which rises to the level of the ring-grooves beneath the heads of the cores, back into the die cavity. This working of the slight overflow of batter back into the die cavities serves to somewhat compress the material at the mouth ring 290 of the cone 291. Thus, when the cone is baked, the texture of the material at the mouth of the cone will be strengthened, just at the place where strength is most desirable. The core heads also virtually sever the overflow 294 from the mouth ring 290 of the cone, leaving these parts attached only by a thin film of material which is easily separated in the trimming tubes. If there be a considerable excess of batter introduced into a mold cavity, it will be forced up the channels 282 and form fingers 293 which will go with the ring 292 when severed in the trimming tubes. This takes care of the case where the attendant fails to get a fine or proper adjustment of the batter pump or where there is some variation in the quality of the batter passing, from time to time, through the pump.

From the foregoing description and with reference to Figures 19, 20 and 21, it will be readily seen that it is possible to produce a cone without any filagree work on the surface thereof whatsoever, if such should be desirable, due to the fact that the ring of material formed by the steam ring 281 will serve to hold each cone in its cavity, while the cores are lifted to free same. After the rings mentioned have completed their function, as an aid to proper extraction, they are trimmed off as shown in Figures 5 and 22.

*The operation.*

Assuming a mold unit to be in the position shown in Figure 4, almost beneath the pump body, and that all of the various power applying mechanisms hereinbefore described are in operation, and the mold units being moved in sequence toward the right in the figure mentioned, the levers 32 will first be engaged by the cams 102 to lock the mold halves together just as the center line of the mold unit is reaching the center line of the discharge orifice of the pump mechanism.

Just at this interval the cam 246 will act upon the roller 256 and, through the mechanism cooperative therewith and hereinbefore described, will close valve communication between the batter duct 199 and the batter charge chambers 214 and open valve communication between the said chambers 214 and the discharge orifices 217, immediately upon the happening of which the cam rollers 244 will be engaged to act through its cooperative mechanism in causing the plungers 212 to quickly eject the charges of batter from the chambers 214 through the orifices 217 and into the closed mold cavities 19 just as the center line of the mold unit reaches the center line of said orifices.

As the unit is carried on with the rollers 29 thereof riding upon the channel 9, the core bar and cores 41, 43 will be lowered, by the carry-over ring 71, over the trackway portions 66, 67 and be guided by the plate 272, into proper relation with the mold halves as hereinbefore described.

As the mold unit passes along, the core bar rollers 49 engage the camel backs 51 (see Figure 1ᴬ) which cause the core bars to be alternately raised slightly and lowered, to facilitate steam escape and distributing the batter throughout the die cavity.

The core bar rollers next engage the lower core bar trackway 52 where they are permitted, by the cut out portions 53, to lift slightly, under steam and batter swelling pressures, at intervals between the uprights 3 and 4 to further facilitate steam escape and work the batter, after which the said rollers are engaged by the uninterrupted portions 54 of the core-bar trackways 52, beyond the uprights 4 and are thereby held locked in the mold cavity 19.

The core bar is held in this locked position while the mold unit traverses the rest of its course from the uprights 4—4 along the trackways 9 and 52, around the rear star wheel 17, along the upper trackways 31 and 56, around the front star wheels 17 back onto the channel 9 just below the center line of the last-named star wheels 17.

As the mold unit advances further, the core bar rollers 49 ride up the trackways 59 and are thereby slightly lifted with relation to the mold-locked product to be thereby freed from the same. After the cores have been thus freed from the cones the levers 32 are engaged by the cracking cams 98 to effect a slight opening of the mold halves, just sufficient to permit the cores 43, which are still projecting deep into the cones, to act as stripper fingers for stripping the cones from both mold halves and leave them free in the mold cavities. The levers 32 next engage the opening cams 99 to cause the full opening of the mold halves and the consequent discharge of the cones after which the mold unit continues along the channels 9 to be relocked and recharged with batter, while the core-bar portion of said unit, riding up the inclines 61, is engaged by the claws 81 of the carry-over rings 71 and carried up and over the carry-over trackway 64, 66 and 67 and down again into cooperation with the mold after the unit has been relocked and its cavities recharged as previously described.

The cracking and opening action of the mold halves is accomplished in a staggered manner, that is, one side of the mold is cracked prior to the cracking of the other side and one side of the mold is opened prior to the opening of the other side by reason of the relative positions of the opposite cam members 98 and 99.

The mold halves 18 are milled in bowed relation with each other, so as to cause the middle points of such halves to engage first so that, when the end extensions 20 are locked together to lock all of the mold cavities, no fins can be formed on the cones due to springing of the molds out from the center.

While accomplishing the above purpose of preventing fins, the bowed construction of the molds cause them to store up energy therein when locked together, which tends to act against the locking links while they act to hold the said mold halves locked together. In other words, the ends of the mold halves have a tendency to spring apart as is clearly indicated by the dotted lines on Figure 47. While the molds are locked, this tendency of the molds to spring open, acts really to hold the toggle links more tightly locked, due to the force thereof being directed past the dead centers of the locking levers (see Figure 13).

Should mold halves be suddenly cracked open as by the cams 98, were they positioned so as to act upon both sides of the mold unit simultaneously, the quick springing action of the mold ends thus quickly released, would throw the levers 32 over too far to accomplish the extraction of the cones as desired and in such timed relation as is necessary to perfect result. Thus, in order to prevent the undesirable operation referred to, the cracking cams 98 are arranged in staggered relation as illustrated in Figure 46, so that the cam 98 at the left acts upon the left hand locking lever just prior to engagement of the right hand lever with the right hand cam 98. By this action I release all of the spring of the mold halves at one time at the one end, so that the other end will then be free to be opened without any interference from mold-spring; it will be readily understood by reference to Figure 48 that the first opened side of the mold cannot spring too far owing to the binding of the end extensions 20 on the slide rod 23 as shown. This binding action, due to the arc on which the ends 20 open and the relative diameters of the slide guide rod 23 and the apertures through which it passes, allows only such action of the lever 32 as is proper and desired and it will be readily understood that the binding will be immediately relieved as the cam 98 on the opposite side is engaged by the corresponding lever 32 to move the parts to the position shown in Figure 49. It is also apparent from Figures 48 and 49 that the action there illustrated also has a tendency to prevent core swing (sometimes caused by a majority of cones sticking to the same side of the mold) due to the approximate retention of the concentric relation of the core and cavity farthest toward the right.

The full opening of the mold is also accomplished in a staggered manner, the left cam 99 engaging slightly before the right cam 99 so as to effect the "full open" on one side with the other side following up as shown in Figure 50.

This manner of accomplishing the "full open", shown in Figure 51, also aids in preventing core swing (due to dragging of the cones) at the start of the full-opening-cam engagement, as above described.

The mold halves 18 may be caused to close in parallel relation, as shown in Figures 52 and 53, or the cams may be set, if desired, to close the molds staggeredly in a manner similar to the opening of the same.

As the mold halves open the cone tips drop down upon the guide plate 103 and are guided thereacross in a manner to cause all of the cones to drop simultaneously upon the catcher fingers 112 which hold them momentarily, then drop them all simultaneously down the chute 105 and into the trimmer tubes 110 where they are forced through by the pushers or heads 141 and fall down the chutes 111 to be picked up and carried off by the conveyor 142.

From the foregoing description, taken in connection with the accompanying drawings, it is thought the construction, operation and advantages of the invention will be readily apparent to those skilled in the art to which the invention appertains.

What I claim is:

1. In a machine of the class described, an endless chain of baking-mold units; means for moving the same progressively; each of said units comprising supporting links, sectional molds and cores; means for loading the units; means for unloading the units; means for heating the units; said loading means comprising core-lift-and-carry-over mechanism which includes rotating rings with pick-up elements, and a batter delivery duct projecting through said rings and arranged to deliver batter charges to the sectional molds while the cores are lifted out of the same and are being carried over the duct and while the sectional molds are passing beneath the duct.

2. In a machine of the class described, an endless connected series of baking-mold units, each including sectional female molds and cores therefor, means causing travel of said units past a loading station and an unloading station, a charging means for delivering batter to the female mold cavities as the units pass the same, mechanism for picking up the cores from the female molds, carrying them over the charging means and restoring them to the female molds, means for effecting a preliminary lift of the cores in the molds and guiding the cores to the core carrying over mechanism.

3. In a machine of the class described, an endless connected series of baking-mold units, each including sectional female molds and cores therefor, means causing travel of said units past a loading station and an unloading station, a charging means for delivering batter to the female mold cavities as the units pass the same, mechanism for picking up the cores from the female molds, carrying them over the charging means and restoring them to the female molds, means for effecting a preliminary lift of the cores in the molds and guiding the cores to the core carrying over mechanism, and means to hold the cores against backward movement as they come under the influence of the pick-up mechanism.

4. In a machine of the class described, an endless connected series of baking-mold units, each including sectional female molds and cores therefor, means causing travel of said units past a loading station and an unloading station, a charging means for delivering batter to the female mold cavities as the units pass the same, mechanism for picking up the cores from the female molds, carrying them over the charging means and restoring them to the female molds, means for effecting a preliminary lift of the cores in the molds and guiding the cores to the core carrying over mechanism, means for guiding the points of the cores, passing over the pump, down into the female mold cavities.

5. In a machine of the class described, an endless connected series of baking-mold units, each including sectional female molds and cores therefor, means causing travel of said units past a loading station and unloading station, a charging pump for delivering batter to the female mold cavities as the units pass the pump, mechanism for picking up the cores from the female molds, carrying them over the pump and restoring them to the female molds, means for effecting a preliminary lift of the cores in the molds and guiding the cores to the core carrying over mechanism, means to hold the cores against backward movement as they come under the influence of the pick-up mechanism, means for guiding the points of the cores after passing over the pump, down into the female mold cavities.

6. In a machine of the class described, an endless chain of traveling units each including supporting links having guide rods, female mold sections slidably mounted on said guide rods, link rods connecting the supporting links of adjacent units together, mold actuating levers, connecting links between said mold actuating levers and the respective mold sections, mold locking cams to be engaged by said mold actuating levers as they pass the same to close and lock the molds, mold cracking and opening cams to unlock and open the molds as the molds pass the same, said units each also including a core-bar with cores for the cavities of the female molds, means for lifting said cores within the molds to release them from the contents of the molds before the molds are cracked, a batter-charging means including a duct held over the traveling units, a core-bar pick-up-and-carry-over device to receive the core-bars from said core lifting means, carry the core-bars and cores over the charging means and restore the same to their molds after the molds have passed beneath the charging means, and means for heating the molds.

7. In a machine of the class described, an endless chain of traveling units each including supporting links having guide rods, female mold sections slidably mounted on said guide rods, link rods connecting the supporting links of adjacent units together, mold actuating levers pivoted on said link rods, connecting links between said mold actuating levers and the respective mold sections, mold locking cams to be engaged by said mold actuating levers as they pass the same to close and lock the molds, mold cracking and opening cams to unlock and open the molds as the molds pass the same, said units each also including a core-bar with cores for the cavities of the female molds, means for lifting said cores within the molds to release them from the contents of the molds before the molds are cracked, a batter-pump including a duct held over the traveling units, a core-bar pick-up-and-carry-over device to receive the core-bars from said core lifting means, carry the core-bars and cores over the pump and restore the same to their molds after the molds have passed beneath the pump, and means for heating the molds.

8. In a machine of the class described, an endless chain of traveling units each including supporting links having guide rods, female mold sections slidably mounted on said guide rods, link rods connecting the supporting links of adjacent units together, mold actuating levers, connecting links between said mold actuating levers and the respective mold sections, mold locking cams to be engaged by said mold actuating levers as they pass the same to close and lock the molds, mold cracking and opening cams to unlock and open the molds as the molds pass the same, said units each also including a core-bar with cores for the cavities of the female molds, means for lifting said cores within the molds to release them from the contents of the molds before the molds are cracked, a batter-pump including a duct held over the traveling units, a core-bar pick-up-and-carry-over device to receive the core-bars from said core lifting means, carry the core-bars and cores over the pump and restore the same to their molds after the molds have passed beneath the pump, means for heating the molds, said pick-up-and-carry-over device comprising lift-over-cam trackways and a rotatable body with lifting fingers to move the core-bars along said lift-over-cam trackways.

9. In a machine of the class described, an endless chain of traveling units each including supporting links having guide rods, female mold sections slidably mounted on said guide rods, link rods connecting the supporting links of adjacent units together, mold actuating levers, connecting links between said mold actuating levers and the respective mold sections, mold locking cams to be engaged by said mold actuating levers as they pass the same to close and lock the molds, mold cracking and opening cams to unlock and open the molds as the molds pass the same, said units each also including a core-bar with cores for the cavities of the female molds, means for lifting said cores within the molds to release them from the contents of the molds before the molds are cracked, a batter-pump including a duct held over the traveling units, a core-bar pick-up-and-carry-over device to receive the core-bars from said core lifting means, carry the core-bars and cores over the pump and restore the same to their molds after the molds have passed beneath the pump, means for heating the molds, said pick-up-and-carry-over device comprising lift-over-cam trackways, a rotatable body with lifting fingers to move the core-bars along said lift-over-cam trackways, said fingers being slotted and said core-bars having projections to be received in the slots of said fingers.

10. In a machine of the class described, an endless chain of traveling units each including supporting links having guide rods, female mold sections slidably mounted on said guide rods, link rods connecting the supporting links of adjacent units together, mold actuating levers, connecting links between said mold actuating levers and the respective mold sections, mold locking cams to be engaged by said mold actuating levers as they pass the same to close and lock the molds, mold cracking and opening cams to unlock and open the molds as the molds pass the same, said units each also including a core-bar with cores for the cavities of the female molds, means for lifting said cores within the molds to release them from the contents of the molds before the molds are cracked, a batter-pump including a duct held over the traveling units, a core-bar pick-up-and-carry-over device to receive the core-bars from said core lifting means, carry the core-bars and cores over the pump and restore the same to their molds after the molds have passed beneath the pump, means for heating the molds, said pick-up-and-carry-over device comprising lift-over-cam trackways, a rotatable body with lifting fingers to move the core-bars along said lift-over-cam trackways, said fingers being slotted and said core-bars having projections to be received in the slots of said fingers, each of said lift-over-cam trackways having an abrupt descent.

11. In a machine of the class described, an endless chain of traveling units each including supporting links having guide rods, female mold sections slidably mounted on said guide rods, link rods connecting the supporting links of adjacent units together, mold actuating levers, connecting links between said mold actuating levers and the respective mold sections, mold locking cams to be engaged by said mold actuating levers as they pass the same to close and lock the molds, mold cracking and opening cams to unlock and open the molds as the molds pass the same, said units each also including a core-bar with cores for the cavities of the female molds, means for lifting said cores within the molds to release them from the contents of the molds before the molds are cracked, a batter-pump including a duct held held over the traveling units, a core-bar pick-up-and-carry-over device to receive the core-bars from said core lifting means, carry the core-bars and cores over the pump and restore the same to their molds after the molds have passed beneath the pump, means for heating the molds, said pick-up-and-carry-over device comprising lift-over-cam trackways, a rotatable body with lifting fingers to move the core-bars along said lift-over-cam trackways, said fingers being slotted and said core-bars having projections to be received in the slots of said fingers, and means for directing the tips of the descending cores into the mold cavities.

12. In a machine of the class described, an endless chain of traveling units each including supporting links having guide rods, female mold sections slidably mounted on said guide rods, link rods connecting the supporting links of adjacent units together, mold actuating levers, connecting links between said mold actuating levers and the respective mold sections, mold locking cams to be engaged by said mold actuating levers as they pass the same to close and lock the molds, mold cracking and opening cams to unlock and open the molds as the molds pass the same, said units each also including a core-bar with cores for the cavities of the female molds, means for lifting said cores within the molds to release them from the contents of the molds before the molds are cracked, a batter-pump including a duct held over the traveling units, a core-bar pick-up-and-carry-over device to receive the core-bars from said core lifting means, carry the core-bars and cores over the pump and restore the same to their molds after the molds have passed the pump, means for heating the molds, said pick-up-and-carry-over device comprising lift-over-cam trackways, a rotatable body with lifting fingers to move the core-bars along said lift-over-cam trackways, said fingers being slotted and said core-bars having projections to be received in the slots of said fingers, each of said lift-over-cam trackways having an abrupt descent, and means for directing the tip of the descending cores into the mold cavities.

13. In a machine of the character described, a connected series of traveling units each including conveying supports with female baking-molds and male cores mounted thereon, means for charging said molds, said charging means comprising a batter injecting pump under which the female baking-molds pass, means to operate the pump at intervals, pick-up means to lift the cores out of the molds, carry them up over the pump and return them to the molds, and fixed guides for starting the cores out of the molds and directing the same to the pick-up means.

14. In a machine of the character described, a connected series of traveling units each including conveying supports with female baking-molds and male cores mounted thereon, means for charging said molds, said charging means comprising a batter injecting pump under which the female baking-molds pass, means to operate the pump at intervals, pick-up means to lift the cores out of the molds, carry them up over the pump and return them to the molds, fixed guides for starting the cores out of the molds and directing the same to the pick-up means, and back check devices to hold the cores against return movement along the fixed guides after being released from the conveying supports of the units.

15. In a machine of the character described, a connected series of traveling units each including conveying supports with female baking-molds and male cores mounted thereon, means for charging said molds, said charging means comprising a batter injecting pump under which the female baking-molds pass, means to operate the pump at intervals, pick-up means to lift the cores out of the molds, carry them up over the pump and return them to the molds, fixed guides for starting the cores out of the molds and directing the same to the pick-up means, back check devices to hold the cores against return movement along the fixed guides after being released from the conveying supports of the units, and for holding the cores against release from the pick-up means during the initial action of lifting the cores.

16. In a machine of the character described, a connected series of traveling units each including conveying supports with female baking-molds and male cores mounted thereon, means for charging said molds, said charging means comprising a batter injecting pump under which the female baking-molds pass, means to operate the pump at intervals, pick-up means to lift the cores out of the molds, carry them up over the pump and return them to the molds, fixed guides for starting the cores out of the molds and directing the same to the pick-up means, and means to extract the baked product from the molds before the cores are picked up.

17. In a machine of the character described, a connected series of traveling units each including conveying supports with female baking-molds and male cores mounted thereon, means for charging said molds, said charging means comprising a batter injecting pump under which the female baking molds pass, means to operate the pump at intervals, pick-up means to lift the cores out of the molds, carry them up over the pump and return them to the molds, fixed guides for starting the cores out of the molds and directing the same to the pick-up means, back check devices to hold the cores against return movement along the fixed guides after being released from the conveying supports of the units, and means to extract the baked product from the molds before the cores are picked up.

18. In a machine of the character described, a connected series of traveling units each including conveying supports with female baking-molds and male cores mounted thereon, means for charging said molds, said charging means comprising a batter injecting pump under which the female baking-molds pass, means to operate the pump at intervals, pick-up means to lift the cores out of the molds, carry them up over the pump and return them to the molds, fixed guides for starting the cores out of the molds and directing them to the pick-up means, back check devices to hold the cores against return movement along the fixed guides after being released from the conveying supports of the units and for holding the cores against release from the pick-up means during the initial action of lifting the core, and means to extract the baked product from the molds before the cores are picked up.

19. In pastry making molds, a pair of mold sections having matching cavities in their opposing faces, the opposing faces being curved longitudinally of the sections whereby they will contact first on a line when said sections are brought together, and means for deflecting the molds and drawing the ends together whereby the area of contact will progressively increase from the first line of contact until the opposing faces contact throughout.

20. In a machine of the class described, a traveling series of units each including conveying-supports, and male and female baking-mold elements carried thereby; a charging duct under which said female mold elements pass to receive their charges of batter; core-bars on which said male elements are mounted; a pick-up-and-carry-over device for lifting the core-bars with their cores over the charging duct, said pick-up and carry-over device comprising rotating rings with pick-up fingers through which rings said charging duct passes.

21. In a machine of the class described, a traveling series of units each including conveying-supports, and male and female baking-mold elements carried thereby; a charging duct under which said female mold elements pass to receive their charges of batter; means for emptying the units of their finished product and preparing the female molds for new batter charges before they pass beneath the charging duct; core-bars on which said male elements are mounted; a pick-up-and-carry-over device for lifting the core-bars with their cores over the charging duct, said pick-up-and-carry-over device comprising rotating rings with pick-up fingers through which rings said charging duct passes.

22. In a machine of the class described, a traveling series of units each including conveying-supports, and male and female baking-mold elements carried thereby; a charging duct under which said female mold elements pass to receive their charges of batter; core-bars on which said male elements are mounted; a pick-up-and-carry-over device for lifting the core-bars with their cores over the charging duct, and lift-over-cam trackways cooperating with said pick-up-and-carry-over device.

23. In a machine of the class described, a traveling series of units each including conveying supports, and male and female baking-mold elements carried thereby; a charging duct under which said female mold elements pass to receive their charges of batter; core-bars on which said male elements are mounted; a pick-up-and-carry-over device for lifting the core-bars with their cores over the charging duct, said pick-up-and-carry-over device comprising rotating rings with pick-up fingers through which rings said charging duct passes, and lift-over-cam trackways cooperating with said pick-up-and-carry-over device.

24. In a machine of the class described, a traveling series of units each including conveying-supports, and male and female baking-mold elements carried thereby; a charging duct under which said female mold elements pass to receive their charges of batter; core-bars on which said male elements are mounted; a pick-up-and-carry-over device for lifting the core bars with their cores over the charging duct, lift-over-cam trackways cooperating with said pick-up-and-carry-over device, said lift-over-cam trackway comprising curved lift portions and abrupt inclined lowering portions, and means for directing the points of the cores into the female molds as the cores are lowered.

25. In a machine of the class described wherein is provided a traveling series of baking-mold units each of which includes a female mold and a core therefor, and wherein is provided a stationary batter delivery duct under which the female molds pass; mechanism for lifting the cores out of the molds and over the delivery duct and lowering the same into the molds, said mechanism including rotating rings with pick-up-and-carry-over fingers said delivery duct passing through said rings.

26. In a machine of the class described wherein is provided a traveling series of baking-mold units, each of which includes a female mold and a core therefor, and wherein is provided a stationary battery delivery duct under which the female molds pass; mechanism for lifting the cores out of the molds and over the delivery duct and lowering the same into the molds, said mechanism including rotating rings with pick-up-and-carry-over fingers, said delivery duct passing through said rings, ring gears carried by said rings and power applying means for driving said ring gears in harmony with the movement of said traveling series of units.

27. In a machine of the class described wherein is provided a traveling series of baking-mold units each including a female mold and a core-bar with a core therefor; a batter pump beneath which the female molds pass to receive their charges of batter, a pick-up-and-carry-over-mechanism for conveying the core-bars and cores over the batter pump, said mechanism comprising rotating pick-up rings having bifurcated radial fingers to receive the core-bars, pick them up, lift them with their cores over the pump, and return them to their molds on the farther side of the pump.

28. In a machine of the class described wherein is provided a traveling series of baking-mold units each including a female mold and a core-bar with a core therefor; a batter pump beneath which the female molds pass to receive their charges of batter, a pick-up-and-carry-over mechanism for conveying the core-bars and cores over the batter pumps, said mechanism comprising rotating pick-up rings having bifurcated radial fingers to receive the core-bars, pick them up, lift them with their cores over the pump, return them to their molds on the farther side of the pump, and a core tip guide plate to direct the cores into the mold cavities.

29. In a machine of the class described wherein is provided a traveling series of baking-mold units each including a female mold and a core-bar with a core therefor; a batter pump beneath which the female molds pass to receive their charges of batter, a pick-up-and-carry-over mechanism for conveying the core-bars and cores over the batter pump, said mechanism comprising rotating pick-up rings having bifurcated radial fingers to receive the core-bars, pick them up, lift them with their cores over the pump, return them to their molds on the farther side of the pump, said core-bars having elements at their ends to project into the fingers of said pick-up rings, and yieldable elements carried by said fingers to engage the ends of said core-bar elements and restrain the core-bars against endwise movement.

30. In a machine of the class described wherein is provided a traveling series of baking-mold units each including a female mold and a core-bar with a core therefor; a batter pump beneath which the female molds pass to receive their charges of batter, a pick-up-and-carry-over mechanism for conveying the core-bars and cores over the batter pump, said mechanism comprising rotating pick-up rings having bifurcated radial fingers to receive the core-bars, pick them up, lift them with their cores over the pump, return them to their molds on the farther side of the pump, and lift-over-cam trackways along which said core-bars slide under influence of said pick-up-and-carry-over mechanism.

31. In a machine of the class described wherein is provided a traveling series of baking-mold units each including a female mold and a core-bar with a core therefor; a batter pump beneath which the female molds pass to receive their charges of batter, a pick-up-and-carry-over mechanism for conveying the core-bars and cores over the batter pump, said mechanism comprising rotating pick-up rings having bifurcated radial fingers to receive the core-bars, pick them up, lift them with their cores over the pump, return them to their molds on the farther side of the pump, said core-bars having elements at their ends to project into the fingers of said pick-up rings, yieldable elements carried by said fingers to engage the ends of said core-bar elements and restrain the core-bars against endwise movement, and lift-over-cam trackways along which said core-bars slide under the influence of said pick-up-and-carry-over mechanism.

32. In a machine of the class described wherein is provided a traveling series of baking-mold units each including a female mold and a core-bar with a core therefor; a batter pump beneath which the female molds pass to receive their charges of batter, a pick-up-and-carry-over mechanism for conveying the core-bars and cores over the batter pump, said mechanism comprising rotating pick-up rings having bifurcated radial fingers to receive the core-bars, pick them up, lift them with their cores over the pump, return them to their molds on the farther side of the pump, lift-over-cam trackways along which said core-bars slide under influence of said pick-up-and-carry-over mechanism, means to loosen the cores from the baked pastry as the units approach the pick-up-and-carry-over mechanism and direct the core-bars to the pick-up fingers.

33. In a machine of the class described wherein is provided a traveling series of baking-mold units each including a female mold and a core-bar with a core therefor; a batter pump beneath which the female molds pass to receive their charges of batter, a pick-up-and-carry-over mechanism for conveying the core bars and cores over the batter pump, said mechanism comprising rotating pick-up rings having bifurcated radial fingers to receive the core-bars, pick them up, lift them with their cores over the pump, return them to their molds on the farther side of the pump, means to loosen the cores from the baked pastry as the units approach the pick-up-and-carry-over mechanism and direct the core-bars to the pickup fingers.

34. In a machine of the class described, wherein is provided a traveling series of baking-mold units each including a female mold and a core-bar with a core therefor; a batter pump beneath which the female molds pass to receive their charges of batter, a pick-up-and-carry-over mechanism for conveying the core bars and cores over the batter pump, said mechanism comprising rotating pick-up rings having bifurcated radial fingers to receive the core bars, pick them up, lift them with their cores over the pump, return them to their molds on the farther side of the pump, means to loosen the cores from the baked pastry as the units approach the pick-up-and-carry-over mechanism and direct the core-bars to the pick-up fingers, and means for restraining the cores against backward movement as they arrive at the pick-up-and-carry-over mechanism.

35. In a machine of the class described wherein is provided a traveling series of baking mold units each including a female mold and a core-bar with a core therefor; a batter pump beneath which the female molds pass to receive their charges of batter, a pick-up-and-carry-over mechanism for conveying the core bars and cores over the batter pump, said mechanism comprising rotating pick-up rings having bifurcated radial fingers to receive the core-bars, pick them up, lift them with their cores over the pump, return them to their molds on the farther side of the pump, means to loosen the cores from the baked pastry as the units approach the pick-up-and-carry-over mechanism and direct the core-bars to the pick-up fingers, means for restraining the cores against backward movement as they arrive at the pick-up-and-carry-over mechanism, said restraining means comprising check pawls arranged to engage the core-bars and hold them in the fingers until the fingers have passed up above the horizontal.

36. In a machine of the class described wherein is provided a traveling series of baking-molds units each including a female mold and a core-bar with a core therefor; a batter pump beneath which the female molds pass to receive their charges of batter, a pick-up-and-carry-over mechanism for conveying the core-bars and cores over the batter pump, said mechanism comprising rotating pick-up rings having bifurcated radial fingers to receive the core-bars, pick them up, lift them with their cores over the pump, return them to their molds on the farther side of the pump, and camel-backs over which said core-bars ride at the commencement of the batter spreading and baking operation to lift mechanically and let fall, alternately, said core-bars, and core locking tracks under which said core-bars pass on leaving said camel-backs.

37. In a machine of the class described wherein is provided a traveling series of baking-mold units each including a female mold and a core-bar with a core therefor; a batter pump beneath which the female molds pass to receive their charges of batter, a pick-up-and-carry-over mechanism for conveying the core-bars and cores over the batter pump, said mechanism comprising rotating pick-up rings having bifurcated radial fingers to receive the core-bars, pick them up, lift them with their cores over the pump, return them to their molds on the farther side of the pump, camel-backs over which said core-bars ride at the commencement of the batter spreading and baking operation to lift mechanically and let fall, alternately, said core-bars, core locking tracks under which said core-bars pass on leaving said camel-backs, said core locking tracks having undulated portions at their beginnings to alternately allow the core-bars to rise during steam and batter expansion and mechanically force the cores down into the mold cavity.

38. In a machine of the class described, a traveling series of units each including conveying-supports, and male and female baking-mold elements carried thereby; a charging duct under which said female mold elements pass to receive their charges of batter; core-bars on which said male elements are mounted; a pick-up-and-carry-over device for lifting the core-bars with their cores over the charging duct, and means to direct the cores into the mold cavities as they approach the same.

39. In a machine of the class described wherein is provided a traveling series of female molds and their cores, and a batter charger under which the female molds pass; a pick-up-and-carry-over mechanism including rotating rings with fingers, fixed ring bearings through which said batter charger projects, a ring gear, a power shaft, a gear train between said shaft and ring gear and including a gear having provisions for angular adjustments whereby the timing of said ring gear with relation to said power shaft may be varied.

40. In a machine of the class described wherein is provided a traveling series of units, each comprising supports, sectional female molds mounted on said supports and having a plurality of cavities, and cores carried by said molds and supports; of a mold section lock mechanism on each end of the female molds, means for unlocking one end of each of the female molds in advance of the unlocking of the other end of the same, said female molds being sprung so as to separate at the end first unlocked, and means for subsequently unlocking the other end of the mold.

41. In a machine of the class described wherein is provided a traveling series of units, each comprising supports, sectional female molds mounted on said supports and having a plurality of cavities, and cores carried by said molds and supports; of a mold section lock mechanism on each end of the female molds, means for unlocking one end of each of the female molds in advance of the unlocking of the other end of the same, said female molds being sprung so as to separate at the end first unlocked, means for subsequently unlocking the other end of the mold, means for opening the molds fully when both ends have been unlocked, said opening means being set to open one end of a mold in advance of the other end.

42. In a machine of the class described wherein is provided a traveling series of units, each comprising supports, sectional female molds mounted on said supports and having a plurality of cavities, and cores carried by said molds and supports; of a mold section lock mechanism on each end of the female molds, means for unlocking one end of each of the female molds in advance of the unlocking of the other end of the same, said female molds being sprung so as to separate at the end first unlocked, means for subsequently unlocking the other end of the mold, means for opening the molds fully when both ends have been unlocked, said opening means being set to open one end of a mold in advance of the other end, means for slightly lifting the cores in the molds before unlocking the same, said cores being provided with core-bars having bearing rollers on each end, said lifting means including lifting tracks onto which said rollers pass, the core-bars being free to swing around the axis of said rollers, said mold unlocking and opening means being so timed with relation to the cone stripping function of the cores that the cones will be loosened from the molds one at a time beginning with that at the end first opened and continuing progressively toward the opposite end, whereby to reduce the swinging tendency of the cores.

43. In a machine of the class described, a trimming mechanism comprising a trimmer base having trimming tubes, means for forcing the articles through said tubes, a trimmings offtake chute adjacent the tubes, and means to agitate said chute.

44. In a machine of the class described, a trimming mechanism comprising a trimmer base having trimming tubes, means for forcing the articles through said tubes, a trimmings offtake chute adjacent the tubes, an offtake conveyor for the trimmed articles, and means for agitating said trimmings offtake chute from said conveyor.

45. In a machine of the class described, a unit comprising a pair of supporting links, each having a longitudinal slot, means holding said links spaced apart, female mold sections located between said spaced links and having apertured lugs at their ends projected through the link slots, guide rods held in the link slots on which said lugs are mounted whereby said mold sections may be permitted to move together or to separate, mold actuating levers carried by said links, connecting links between said levers and the mold sections which constitute, with said levers, toggle locks for the ends of the molds, said levers having means to be engaged for opening and closing the molds.

46. In a machine of the class described, a unit comprising a pair of supporting links, each having a longitudinal slot, means holding said links spaced apart, female mold sections located between said spaced links and having apertured lugs at their ends projected through the link slots, guide rods held in the link slots on which said lugs are mounted whereby said mold sections may be permitted to move together or to separate, mold actuating levers carried by said links, connecting links between said levers and the mold sections which constitute, with said levers, toggle locks for the ends of the molds, said levers having means to be engaged for opening and closing the molds, said supporting links including slotted extension flanges, a core-bar adapted to be held in the slots of said flanges, cores on the core-bar, one for each mold cavity.

47. In an apparatus of the class described, male and sectional female baking-mold elements, said female element containing a cavity having a die portion and a neck, said male element having a die portion and a head to enter and partially fill the female die cavity and fill the neck, said female element's cavity having an annular steam groove in the neck adjacent the top of the die portion of the cavity and having steam escape vents leading from the steam groove to atmosphere.

48. In an apparatus of the class described, male and sectional female baking-mold elements, said female element containing a cavity having a die portion and a neck, said male element having a die portion and a head to enter and partially fill the female die cavity and fill the neck, said female element's cavity having an annular steam groove in the neck adjacent the top of the die portion of the cavity and having steam escape vents leading from the steam groove to atmosphere, the mouth of said neck being outwardly flared or bevelled to guide the core head to place, said core head fitting said neck closely whereby to cut off batter passage and to center the core in the mold.

49. A sectional female baking-mold having a cavity comprising a die portion and a neck portion, the latter extending from the die portion to the mouth of the cavity, a core adapted to enter and partially fill said die cavity portion and having a head to fit the neck of said cavity, said neck portion having a steam and batter overflow equalizing pocket to form a ring around the outer edge of the baked product formed in the die portion.

50. A sectional female baking-mold having a cavity comprising a die portion and a neck portion, the latter extending from the die portion to the mouth of the cavity, a core adapted to enter and partially fill said die portion and having a head to fit the neck of the cavity, said neck portion having a steam and batter overflow equalizing pocket recessed into the wall of the neck of the cavity, and vents from said pocket to atmosphere.

51. A sectional female baking-mold having a cavity comprising a die portion and a neck portion, the latter extending from the die portion to the mouth of the cavity, a core adapted to enter and partially fill said die portion and having a head to fit the neck of the cavity, said neck portion having a steam and batter overflow equalizing pocket to form a ring around the outer edge of the baked product formed in the die portion, the diameter of said neck portion being not less than the greatest diameter of said die portion whereby the ring formed in said equalizing pocket will have an inside diameter not less than the greatest diameter of the product formed in the die portion of said cavity, and means for holding said core in the mold in a position to cause the ring to be united to the mouth of the product by a thin web.

52. In a machine of the class described wherein is provided an endless series of connected sets of male and female baking-mold units; means to loosen and slightly lift the male unit in the female unit, said means comprising core lifter tracks that include fixed bars with removable and adjustable entrant portions.

53. In apparatus of the class described, the combination with the pick-up-and-carry-over mechanism, of lift-over-cam trackways.

54. In apparatus of the class described, the combination with the pick-up-and-carry-over-mechanism, of lift-over cam trackways, said trackways including removable wear plates.

55. In apparatus of the class described, the combination with the pick-up-and-carry-over mechanism, of lift-over-cam trackways, said trackways including removable and adjustable wear plates.

56. In a machine of the class described, batter charging mechanism comprising a body having a receiving chamber and an outlet passage therefrom, a rotary valve controlling said passage, a pump cylinder having ports in cooperation with said valve and said outlet passage, a piston in said cylinder, piston reciprocating means comprising a rock shaft, a crank connection between said rock shaft and said piston, crank, link and operating-lever mechanism connected with said rock shaft, valve rotating means comprising a reciprocable rod, a lever on the valve engaging said rod, a rod operating lever and connections between said rod operating lever and said reciprocable rod, a cam for moving said operating levers, said cam including a cam groove, a roller in said groove carried by said first mentioned operating lever to effect its movement in both directions, said cam operating said rod operating lever in one direction, said rod operating lever moving in the opposite direction by gravity.

57. In a machine of the class described, batter charging mechanism comprising a body having a receiving chamber and an outlet passage therefrom, a rotary valve controlling said passage, a pump cylinder having ports in cooperation with said valve and said outlet passage, a piston in said cylinder, piston reciprocating means comprising a rock shaft, a crank connection between said rock shaft and said piston, crank, link and operating-lever mechanism connected with said rock shaft, valve rotating means comprising a reciprocable rod, a lever on the valve engaging said rod, a rod operating lever, connections between said rod operating lever and said reciprocable rod, a cam for moving said operating levers, said cam including a cam groove, a roller in said groove carried by said first mentioned operating lever to effect its movement in both directions, said cam operating said rod operating lever in one direction, a supplemental rod operating lever linked to said rod operating lever and adapted to be engaged by said cam to move said operating lever in the opposite direction, said rod operating lever moving in the opposite direction by gravity.

58. In a batter charging mechanism, a pump comprising a body having a batter receiving duct and a plurality of outlets therefor, said body having a valve chamber for each outlet, a rotary sleeve-valve in each chamber controlling the passage through the same from the receiving duct to the discharge end of said outlets, pump cylinders cooperating with said valve, pump pistons in the several cylinders, means to operate said valves in unison, means to operate said pistons in unison, individual adjusting means for each valve whereby the timing of the several valves may be modified, said piston operating means including a bar joining all pistons, means to move said bar, and means securing said bar to the several pistons and allowing for individual adjustments of the positions of the several pistons with relation to said bar.

59. In a machine of the type employing an endless chain of split-molds and cores, and means for discharging the contents thereof, a stationary receiving chute, a pair of receiving fingers straddling the chute, means to raise and lower said fingers to catch the discharged product and lower it onto the receiving chute.

60. In a machine of the type employing an endless chain of split-molds and cores, and means for discharging the contents thereof, a stationary receiving chute, a pair of receiving fingers straddling the chute, means to raise and lower said fingers to catch the discharged product and lower it onto the receiving chute, and a guide plate beneath the molds projecting over the ends of the fingers to cause the discharging product to be released to said fingers at a uniform place.

61. In a machine of the class described wherein is provided a traveling series of female molds and their cores, a batter charger under which the female molds pass; a pick-up-and-carry-over mechanism including rotating rings with fingers, fixed ring bearings for said rings, a ring gear, a power shaft, a gear train between said shaft and ring gear and including a gear having provisions for angular adjustments whereby the timing of said ring gear with relation to said power shaft may be varied.

62. In an apparatus of the class described, an endless series of traveling units including male and female molds, a duct under which the female molds pass to receive their charges of batter, a pick-up-and-carry-over device to lift the male molds out of the female molds and pass them over said duct, and lift-over-cam trackways cooperating with said pick-up-and-carry-over device.

63. In an apparatus of the class described, an endless series of traveling units including male and female molds, a duct under which the female molds pass to receive their charges of batter, a pick-up-and-carry-over device to lift the male molds out of the female molds and pass them over said duct, lift-over-cam trackways cooperating with said pick-up-and-carry-over device, said units each including supports for said male molds and female molds, and means to hold the male molds over said female molds as the units pass to the pick-up-and-carry-over device, and means to raise the male molds partly out of the female molds and direct them to the pick-up-and-carry-over device.

64. In an apparatus of the class described, an endless series of traveling units including male and female molds, a duct under which the female molds pass to receive their charges of batter, a pick-up-and-carry-over device to lift the male molds out of the female molds and pass them over said duct, lift-over-cam trackways cooperating with said pick-up-and-carry-over device, said units each including supports for said male molds and female molds, means to hold the male molds over said female molds as the units pass to the pick-up-and-carry-over device, means to raise the male molds partly out of the female molds and direct them to the pick-up-and-carry-over device, said raising means including ascending tracks and back check pawls cooperating therewith.

65. A sectional female baking-mold having a cavity comprising a die portion and a neck portion, the latter extending from the die portion to the mouth of the cavity, a core adapted to enter and partially fill said die cavity portion and having a head to fit the neck of said cavity, said neck portion having a steam and batter overflow equalizing pocket recessed into the wall of the neck of the cavity.

66. A female mold having a cavity consisting of a die portion of the form and size of a cone, and a neck portion extending from the top of the die portion to the mouth of the mold, a core adapted to enter and partially fill said die portion and having a neck to fit said neck portion, said neck portion of the female mold having longitudinal steam and batter overflow passages united by an annular steam and batter overflow equalizing groove.

67. A female mold having a cavity consisting of a die portion of the form and size of a cone, and a neck portion extending from the top of the die portion to the mouth of the mold, a core adapted to enter and partially fill said die portion and having a neck to fit said neck portion, said neck portion of the female mold having longitudinal steam and batter overflow passages united by an annular steam and batter overflow equalizing groove, said groove adapted to be closed off by said neck when said neck and core are fully inserted.

68. In a machine of the class described, an endless chain of baking-mold units, a batter charger and a core pick-up-and-carry-over mechanism, means to drive said chain at a constant speed, mechanism for discharging the product from said mold units, mechanism for trimming the said product, cam operated devices operating said batter charger and trimming mechanism, power transmitting connections from said chain driving means to said cam operated devices and said pick-up-and-carry-over mechanism, and including a shaft with a gear adjustably secured therewith whereby the timing of said cam operated devices may be adjusted with relation to the travel of the said endless chain of molds.

69. In a machine of the class described, the combination with the moving series of female molds and cores, the batter charging mechanism under which said molds pass and the core pick-up-and-carry-over mechanism, of a core tip guide to direct the cores into the molds as they are lowered by said pick-up-and-carry-over mechanism.

70. In a machine of the class described, the combination with the moving series of female molds and cores, the batter charging mechanism under which said molds pass and the core pick-up-and-carry-over mechanism, of a core tip guide to direct the cores into the molds as they are lowered by said pick-up-and-carry-over mechanism, and a guard plate carried by said core tip guide and projecting over said batter charging mechanism.

71. In a machine of the class described, the combination with the moving series of female molds and cores, the batter charging mechanism under which said molds pass and the core pick-up-and-carry-over mechanism, of a core tip guide to direct the cores into the molds as they are lowered by said pick-up-and-carry-over mechanism, a guard plate carried by said core tip guide and projecting over said batter charging mechanism, and means for adjusting the position of said guide.

72. In a machine of the class described, wherein is provided a traveling support with a series of baking-mold units each including female molds and cores, core-bars for said cores, cam tracks for imparting a slight lift to said core-bars, and a pick-up-and-carry-over mechanism to which said core-bars are directed by said cam tracks; lateral guide plates adapted to be engaged by the ends of the core bars and serving to restrain said core-bars against endwise movement.

73. In a machine of the class described, wherein is provided a traveling support with a series of baking-mold units each including female molds and cores, core-bars for said cores, cam tracks for imparting a slight lift to said core-bars, a pick-up-and-carry-over mechanism to which said core-bars are directed by said cam tracks; lateral guide plates adapted to be engaged by the ends of the core bars and serving to restrain said core-bars against endwise movement, and back check pawls cooperative with said tracks and guides.

74. In an apparatus of the class described, a batter charger embodying a pump with a piston, a rock shaft to operate the pump piston, an actuating crank loose on said rock shaft, a cam member fixed to said rock shaft and cooperating with said actuating crank and means to adjust the operative connection between said cam member and said actuating crank.

75. In a machine of the class described, a batter charging mechanism comprising a pump body having a batter duct, and a plurality of valve housings, a plunger cylinder in each of said housings, a plunger in each of said cylinders, ports in said housings and said cylinders for providing batter communication between said batter duct and the batter chambers of said cylinders and between said batter chambers and atmosphere, a valve in each housing with ports for normally holding open the communication between batter duct and the respective batter chambers, the communication between said batter chambers and atmosphere closed, means for operating all of the plungers simultaneously in the said batter chambers for sucking a uniform charge of batter into the chambers from the said batter duct when said valves are in the normal position and ejecting the batter from said chambers to atmosphere when said valves are shifted, means to operate said valves, and means for adjusting, separately, the suction strokes of said plungers.

76. In a machine of the class described, a batter charging mechanism comprising a pump body having a batter duct, and a plurality of valve housings, a plunger cylinder in each of said housings, a plunger in each of said cylinders, ports in said housings and said cylinders for providing batter communication between said batter duct and the batter chambers of said cylinders and between said batter chambers and atmosphere, a valve in each housing with ports for normally holding open the communication between batter duct and the respective batter chambers, the communication between said batter chambers and atmosphere closed, means for operating all of the plungers simultaneously in the said batter chambers for sucking a uniform charge of batter into the chambers from the said batter duct when said valves are in the normal position and ejecting the batter from said chambers to atmosphere when said valves are shifted, means to operate said valves, means for adjusting, separately, the suction strokes of said plungers, and means for collectively adjusting the suction stroke of all of said plungers.

77. In pastry making molds, a pair of female sections having semi-mold cavities in their opposing faces, the opposing faces of said sections being curved whereby when said sections are brought together they will first contact at the center, and means for drawing the ends of the sections to hold the same closed.

78. In pastry making molds, a pair of female sections having semi-mold cavities in their opposing faces, the opposing faces of said sections being curved whereby when said sections are brought together they will first contact at the center, and toggle mechanism at the ends of the sections to draw the same together and hold the opposing faces of the sections in contact throughout.

79. In pastry making molds, a pair of female sections having semi-mold cavities in their opposing faces, the opposing faces of said sections being curved whereby when said sections are brought together they will first contact at the center, and said mold sections when an end is released being adapted to spring apart at the released end.

80. In pastry making molds, a pair of female sections having semi-mold cavities in their opposing faces, the opposing faces of said sections being curved whereby when said sections are brought together they will first contact at the center, toggle mechanism at the ends of the sections to draw the same together and hold the opposing faces of the sections in contact throughout, and said mold sections when an end is released being adapted to spring apart at the released end.

81. In a machine of the class described, a unit comprising a pair of end supporting elements, each having a longitudinal slot, means holding said elements spaced apart, female mold sections located between said spaced apart elements and having apertured lugs at their ends projecting into the slots, guide rods held in the slots on which said lugs are mounted, whereby said mold sections may be permitted to move together or to separate, mold actuating levers carried by said supporting elements, connecting links between said levers and the mold sections which constitute, with said levers, toggle locks for the ends of the molds, said levers having means to be engaged by opening and closing the molds.

82. In a machine of the class described, the combination of a frame, sprockets mounted to rotate about horizontal axes in each end thereof, an endless carrier passing over said sprockets and driven thereby, a plurality of mold units on said carrier, each mold unit comprising a cavity containing member secured to the carrier and a loose core member, and means on the sprockets for holding the core members in the cavity members as they pass over the sprockets.

83. In a machine of the class in which there is an endless carrier having upper and lower runs driven by sprockets at opposite ends of the frame of the machine, the combination with female mold members mounted on the carrier, of loose male members cooperating with the respective female members, a track-way for holding the male members in the mold members on the upper run of the carrier, and means on the sprockets for holding the male members in the mold members while passing over the sprockets.

WALTER McLAREN.

in their opposing faces, tne opposing faces of said sections being curved whereby when said sections are brought together they will first contact at the center, and toggle mechanism at the ends of the sections to draw the same together and hold the opposing faces of the sections in contact throughout.

79. In pastry making molds, a pair of female sections having semi-mold cavities in their opposing faces, the opposing faces of said sections being curved whereby when said sections are brought together they will first contact at the center, and said mold sections when an end is released being adapted to spring apart at the released end.

80. In pastry making molds, a pair of female sections having semi-mold cavities in their opposing faces, the opposing faces of said sections being curved whereby when said sections are brought together they will first contact at the center, toggle mechanism at the ends of the sections to draw the same together and hold the opposing faces of the sections in contact throughout, and said mold sections when an end is released being adapted to spring apart at the released end.

81. In a machine of the class described, a unit comprising a pair of end supporting elements, each having a longitudinal slot, means holding said elements spaced apart, female mold sections located between said spaced apart elements and having apertured lugs at their ends projecting into the slots, guide rods held in the slots on which said lugs are mounted, whereby said mold sections may be permitted to move together or to separate, mold actuating levers carried by said supporting elements, connecting links between said levers and the mold sections which constitute, with said levers, toggle locks for the ends of the molds, said levers having means to be engaged by opening and closing the molds.

82. In a machine of the class described, the combination of a frame, sprockets mounted to rotate about horizontal axes in each end thereof, an endless carrier passing over said sprockets and driven thereby, a plurality of mold units on said carrier, each mold unit comprising a cavity containing member secured to the carrier and a loose core member, and means on the sprockets for holding the core members in the cavity members as they pass over the sprockets.

83. In a machine of the class in which there is an endless carrier having upper and lower runs driven by sprockets at opposite ends of the frame of the machine, the combination with female mold members mounted on the carrier, of loose male members cooperating with the respective female members, a track-way for holding the male members in the mold members on the upper run of the carrier, and means on the sprockets for holding the male members in the mold members while passing over the sprockets.

WALTER McLAREN.

DISCLAIMER 1,551,998.—*Walter McLaren*, Dayton, Ohio. AUTOMATIC CUP-PASTRY-MAKING MACHINE. Patent dated September 1, 1925. Disclaimer filed August 23, 1939, by the assignee, *National Biscuit Company*.

Hereby enters this disclaimer to claims 1, 2, 3, 6, 7, 8, 13, 14, 15, 16, 17, 18, 19, 20, 21, 22, 23, 25, 26, 27, 29, 30, 31, 32, 33, 34, 35, 36, 39, 45, 46, 52, 53, 54, 55, 56, 57, 58, 61, 62, 63, 64, 72, 73, 74, 75, 76, 77, 78, 79, 80, 81, 82, and 83.

[*Official Gazette September 19, 1939.*]

DISCLAIMER 1,551,998.—*Walter McLaren*, Dayton, Ohio. AUTOMATIC CUP-PASTRY-MAKING MACHINE. Patent dated September 1, 1925. Disclaimer filed August 23, 1939, by the assignee, *National Biscuit Company*.

Hereby enters this disclaimer to claims 1, 2, 3, 6, 7, 8, 13, 14, 15, 16, 17, 18, 19, 20, 21, 22, 23, 25, 26, 27, 29, 30, 31, 32, 33, 34, 35, 36, 39, 45, 46, 52, 53, 54, 55, 56, 57, 58, 61, 62, 63, 64, 72, 73, 74, 75, 76, 77, 78, 79, 80, 81, 82, and 83.

[*Official Gazette September 19, 1939.*]